(12) United States Patent
Figura et al.

(10) Patent No.: US 8,958,438 B2
(45) Date of Patent: Feb. 17, 2015

(54) SYSTEMS AND METHODS FOR NETWORK MONITORING AND TESTING USING A GENERIC DATA MEDIATION PLATFORM

(75) Inventors: Mark Figura, Methuen, MA (US); Tibor Ivanyi, Pelham, NH (US); Anne-Marie Turgeon, Wakefield, MA (US); Sergey Eidelman, Bolton, MA (US)

(73) Assignee: Empirix, Inc., Billerica, MA (US)

( * ) Notice: Subject to any disclaimer, the term of this patent is extended or adjusted under 35 U.S.C. 154(b) by 182 days.

(21) Appl. No.: 13/554,964

(22) Filed: Jul. 20, 2012

(65) Prior Publication Data

US 2013/0182700 A1    Jul. 18, 2013

Related U.S. Application Data

(60) Provisional application No. 61/510,995, filed on Jul. 22, 2011.

(51) Int. Cl.
*H04J 3/22* (2006.01)
*H04L 12/26* (2006.01)
*H04L 12/24* (2006.01)

(52) U.S. Cl.
CPC ............... *H04L 43/08* (2013.01); *H04L 43/16* (2013.01); *H04L 41/5009* (2013.01); *H04L 43/0876* (2013.01)
USPC ........................................................ 370/465

(58) Field of Classification Search
CPC .............. H04L 43/0852; H04L 1/0001; H04L 2012/565
USPC .......................................... 370/252, 465, 395.5
See application file for complete search history.

(56) References Cited

U.S. PATENT DOCUMENTS

| | | | |
|---|---|---|---|
| 5,809,235 A | 9/1998 | Sharma et al. | |
| 6,249,572 B1 | 6/2001 | Brockman et al. | |
| 6,279,077 B1 | 8/2001 | Nasserbakht et al. | |
| 7,624,396 B1 | 11/2009 | Isenberg | |
| 7,644,365 B2 * | 1/2010 | Bhattacharya et al. | 715/736 |
| 7,840,285 B2 | 11/2010 | Wilson et al. | |
| 8,599,682 B2 * | 12/2013 | Ger | 370/218 |
| 2002/0103942 A1 | 8/2002 | Comeau | |
| 2003/0214963 A1 | 11/2003 | Moody et al. | |
| 2004/0039968 A1 | 2/2004 | Hatonen et al. | |
| 2004/0098358 A1 | 5/2004 | Roediger | |
| 2004/0133672 A1 | 7/2004 | Bhattacharya et al. | |
| 2004/0266442 A1 | 12/2004 | Flanagan et al. | |
| 2005/0097209 A1 | 5/2005 | McDonagh et al. | |
| 2008/0196002 A1 | 8/2008 | Koster | |
| 2010/0077077 A1 | 3/2010 | Devitt | |
| 2010/0211519 A1 | 8/2010 | Giannetti | |

(Continued)

OTHER PUBLICATIONS

International Patent Application No. PCT/US2012/047755: International Search Report and Written Opinion dated Oct. 15, 2012, 6 pages.

(Continued)

*Primary Examiner* — Chandrahas Patel
(74) *Attorney, Agent, or Firm* — Baker & Hostetler LLP

(57) ABSTRACT

Embodiments are directed to systems and methods for network monitoring and testing using a generic data mediation platform between one or more probes and one or more dashboards. The generic data mediation platform performs data correlation, filtering enrichment and aggregation of events obtained from monitored networks.

12 Claims, 15 Drawing Sheets

(56) References Cited

U.S. PATENT DOCUMENTS

2011/0016123 A1    1/2011    Pandey et al.
2011/0166912 A1    7/2011    Susumago

OTHER PUBLICATIONS

International Patent Application No. PCT/US2012/047758: International Search Report and Written Opinion dated Nov. 20, 2012, 6 pages.

U.S. Appl. No. 13/554,924, filed Jul. 20, 2012, Ivanyi.
U.S. Appl. No. 13/554,925, filed Jul. 20, 2012, Eidelman.
U.S. Appl. No. 13/554,944, filed Jul. 20, 2012, Turgeon.
International Patent Application No. PCT/US2012/047759: International Search Report and Written Opinion dated Oct. 2, 2012, 12 pages.
International Patent Application No. PCT/US2012/047761: International Search Report and Written Opinion dated Oct. 12, 2012, 13 pages.

\* cited by examiner

| ID | CDR |
|---|---|
| START-TIME | 11:01 |
| END-TIME | 11:34 |
| CALLER | +1234567 |
| CALLEE | +7654321 |
| VOICE-QUALITY | 4.0 |

| ID | CDR |
|---|---|
| START-TIME | 14:11 |
| END-TIME | 15:00 |
| CALLER | +1234555 |
| CALLEE | +7654321 |
| VOICE-QUALITY | 2.1 |

FIG. 2

```
<kpi-data name="ss7.NumCallAttempsPerRegion" edr="ss7.CallCdr"  >
  <dimension op="copy" fieldName="region"/>
  <value    op="const" value="1" />
</kpi-data>
```

FIG. 6A

```
<kpi-data name="ss7.NumCallAttempsPerRegion" edr="ss7.*"  >
  <dimension op="copy" fieldName="region"/>
  <value    op="const" value="1" />
</kpi-data>
```

FIG. 6B

```
<kpi-data name="sip.NumCallAttempsPerRegion" edr="sip.CallCdr"  >
  <dimension op="copy" fieldName="region"/>
  <value    op="const" value="1" />
</kpi-data>
```

FIG. 6C

```
<kpi  name="NumCallAttempsPerRegion"
     period="120"
     valueType="integer"
     keepMode="all"
     keepSelector="count"
  >
  <data>sip.NumCallAttempsPerRegion</data>
  <data>ss7.NumCallAttempsPerRegion</data>
 </kpi>
```

FIG. 7

```
<kpi-channel name="KpiOutput"
       kpi="NumCallAttempsPerRegion"
  >
 <parameter name="location"         value="/Kpi1/" />
 <parameter name="finalFilename"    value="KPI{DATE}.csv" />
 <parameter name="activeFilename"   value="ACTIVE_KPI.csv" />
 <parameter name="dateFormat"       value="yyyy_MM_dd_HH_mm_ss" />
 <parameter name="outputFields"     value="name timestamp dimension count" />
 <parameter name="outputHeaders"    value="Name,Timestamp,Dimension,Count" />
</kpi-channel>
```

FIG. 8A

Name,Timestamp,Dimension,Count,
NumCallSuccessPerRegion,1310750931,2,23670,
NumCallAttempsPerRegion,1310750931,2,23682,
NumCallAttempsPerRegion,1310751051,2,23678,
NumCallSuccessPerRegion,1310751051,2,23666,
NumCallAttempsPerRegion,1310751171,2,23683,
NumCallSuccessPerRegion,1310751171,2,23671,

FIG. 8B

```
<kpi-data name="sip.NumBadMosPerCustomerAll" edr="sip.CallCdr" >
 <dimension ref="kpid.Customer" />
 <value    op="and">
  <expression op="float:gt" value="0.0" fieldName="mos_score" />
  <expression op="float:lt" value="${voip.BadMosThreshold}" fieldName="mos_score" />
 </value>
</kpi-data>
```

FIG. 9A

```
<expression name="kpid.Customer" op="or" >
 <expression op="if" >
  <expression op="integer:le" value="2" >
   <expression op="edr:lookup" lookupName="srcIpInfo" index="1" />
  </expression>
  <expression op="edr:lookup" lookupName="srcIpInfo" index="3" />
  <expression op="null" />
 </expression>
 <expression op="if" >
  <expression op="integer:le" value="2" >
   <expression op="edr:lookup" lookupName="dstIpInfo" index="1" />
  </expression>
  <expression op="edr:lookup" lookupName="dstIpInfo" index="3" />
  <expression op="null" />
 </expression>
</expression>
```

FIG. 9B

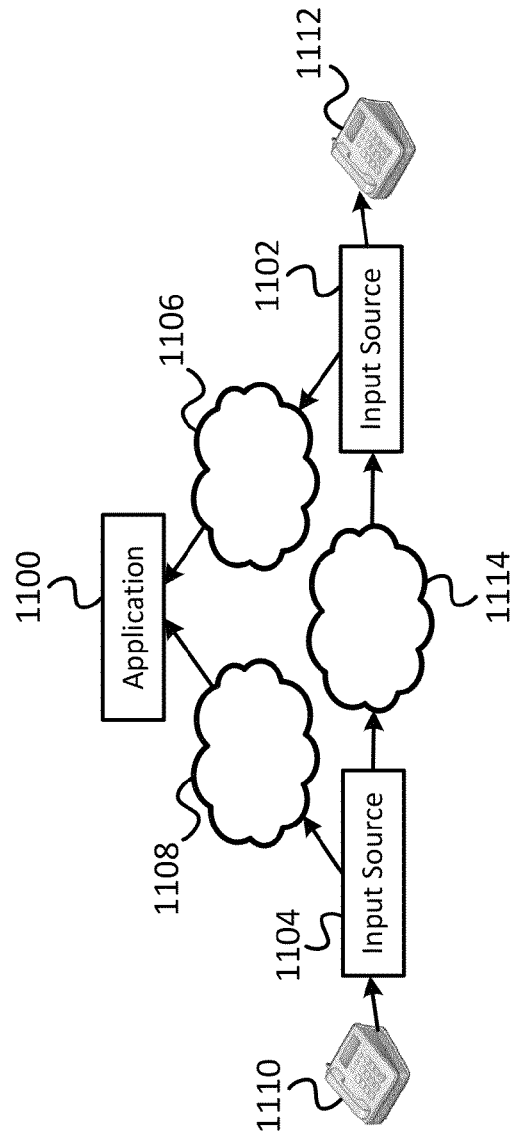

ial Application No. 61/510,995, filed Jul. 22, 2011,
SYSTEMS AND METHODS FOR NETWORK MONITORING AND TESTING USING A GENERIC DATA MEDIATION PLATFORM

CROSS REFERENCE TO RELATED APPLICATIONS

This application is a non-provisional application of U.S. Provisional Application No. 61/510,995, filed Jul. 22, 2011, which is incorporated herein by reference in its entirety.

BRIEF DESCRIPTION

An embodiment is directed to a generic data mediation platform for use in network monitoring, testing, and analytics. Many network monitoring and testing systems are composed of probes which gather information and dashboards which report that information. Embodiments of the mediation platform described herein integrate with disparate data sources and data consumers, rather than having fixed inputs and fixed outputs. Data from previously independent data sources can be combined and analyzed together, providing additional value to the data consumers. The integrated data can also be output to different types of data consumers, each of which might expect to receive different sets of data in different formats.

TECHNICAL FIELD

The present application relates to network monitoring, testing and analysis. In particular, the present application relates to real time monitoring of networks.

BACKGROUND

Network monitoring and testing systems typically rely upon one or more probes to communicate directly with one or more dashboards to output data from the probes to the dashboards in one or more formats, without any form of data mediation between the probes and the dashboards.

SUMMARY

Embodiments are directed to systems and methods for network monitoring and testing using a generic data mediation platform between one or more probes and one or more dashboards. The generic data mediation platform performs data correlation, filtering enrichment and aggregation of events obtained from monitored networks.

BRIEF DESCRIPTION OF THE DRAWINGS

FIG. 2 illustrates embodiments for two data events generated in a computer telephony system in accordance with an embodiment.

FIGS. 6A, 6B and 6C illustrate a set of rules used to map data events to KPI data events in accordance with an embodiment.

FIG. 7 illustrates a rule used to define a KPI aggregator in accordance with an embodiment.

FIGS. 8A-8B illustrate a configuration and actual output, in accordance with an embodiment, for a KPI output for the KPI aggregator illustrated in FIG. 7.

FIG. 9A illustrates a rule that processes SIP event data records in accordance with an embodiment.

FIG. 9B illustrates the use of lookup tables for calculations in accordance with an embodiment.

FIG. 10 illustrates two input sources containing locally ordered events to be communicated to an application in accordance with an embodiment.

FIG. 11 illustrates an application receiving related events from different input sources through network clouds in accordance with an embodiment.

DETAILED DESCRIPTION OF ILLUSTRATIVE EMBODIMENTS

Figure 1:
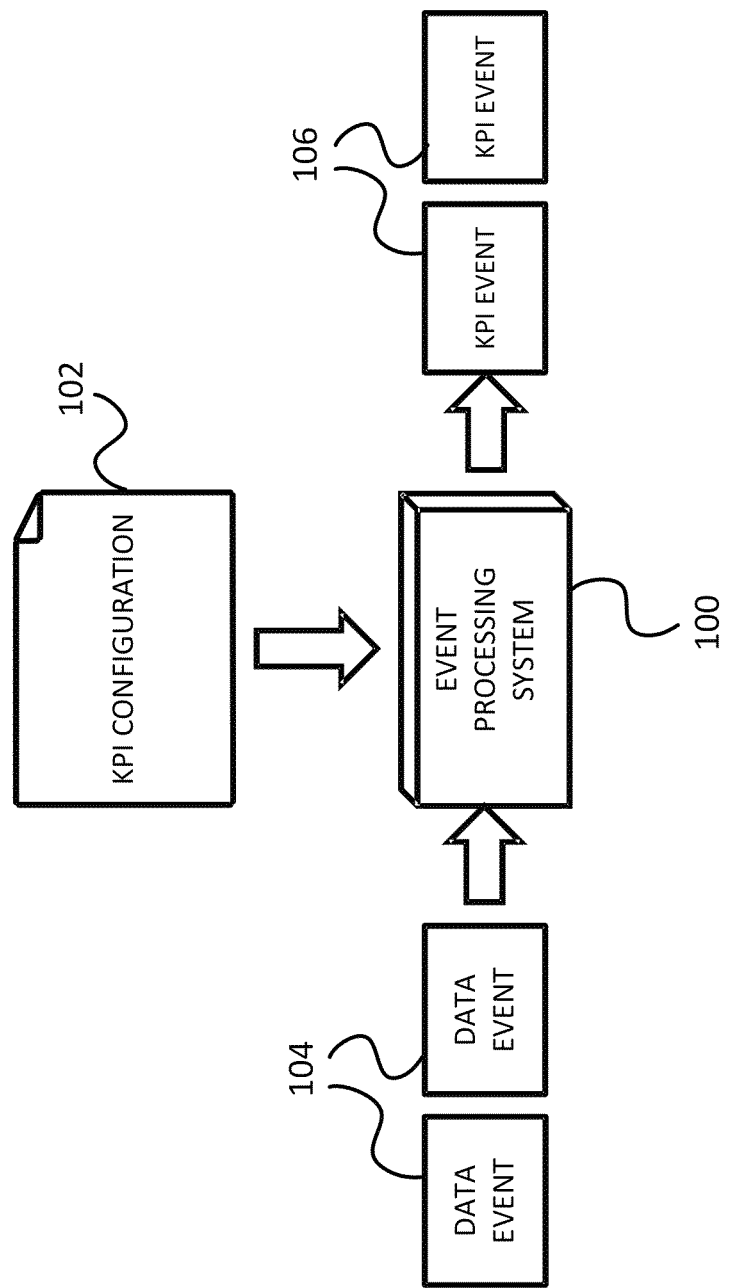
FIG. 1 is a high level block diagram of an embodiment of a flexible KPI description methodology in accordance with an embodiment.

Embodiments are directed to a method of configuring how dimension-value based key performance indicators (KPIs) are calculated from a stream of homogenous or heterogenous data events. The present embodiments will be described in the context of calculating KPIs for call detail records (CDRs) for computer telephony events, such as minimum voice quality score per user, average call duration per network node, number of calls per region, average number of calls per customer with a low MOS, etc.

Present embodiments are particularly useful for network monitoring, including VoIP networks, voice quality monitoring, and quality of user experience in networks.

An embodiment creates an intermediate timestamp-dimension-value triplet KPI data event from a data event (also referred to as an event detail record). The KPI data event is subsequently processed by a KPI engine that combines, or aggregates, one or more KPI data events in various ways, and which outputs computed KPIs to files or to a dashboard. A set of rules or formulas are used to calculate the components of a KPI data event from a data event. Multi-dimensional KPIs can be implemented by concatenating two or more single dimension KPI values. Finally, a set of rules or formulas can also be used to generate a set of aggregated metrics per value of dimension.

A data event is created from raw data generated by a system, such as network probe. For example, in VoIP networks, a network probe many monitor media quality information such as MOS, packet jitter, packet loss, among other metrics.

The data generated by the network probe may be saved to a file on a regular basis. Alternatively, the network probe may generate events that are communicated the KPI engine described herein. The KPI configuration described herein first enables a user to define how to convert the raw data into a KPI data event.

A KPI data event is not limited to a timestamp-dimension-value triplet, but may also include additional name-value pairs. The timestamp denotes the date and/or time when a certain event occurs. The dimension refers to the construct being measured. The value represents the actual numeric data, character data, or some other data associated with the dimension.

Embodiments of the dynamic KPI configuration described here are particularly useful in systems where it is desirable to measure a large number of KPIs. Coding the calculations and routines associated with different KPIs, in addition to the required testing of the coded routines, requires a large amount of time. In addition, after these routines have been coded, the end-user has no control over the coded KPIs (other than the control provided through the system's interface, and even then changes allowed are minimal and highly constrained). Therefore, if a system allows a user to measure KPIs named A, B, and C, then the user would be limited to only KPIs A, B, and C. If an additional KPI was needed, the user would be required to request a change in the code of the system to make such a change. Finally, if a user paid for a system that computes KPIs A-Z, and the user needed only combinations of KPIs A-D, then there is both development time wasted, and the end-user effectively ends up paying for KPIs and features that are not used.

Typically engineers that develop systems that include calculations of KPIs write the corresponding calculations and routines in the programming language(s) being used to develop the system. This has the advantage of being the most efficient implementation. However, this approach lacks user configurability, flexibility, and results in a larger program code that is more expensive to maintain over the lifetime of the system.

Embodiments described herein provide a flexible KPI description methodology that can be used to implement KPIs, allowing users to modify existing KPIs and to implement additional KPIs when needed. By using a set of rules and formulas to define KPIs and the calculations associated with KPIs, a user can simply modify a configuration file, rather than actually change the source code of the system.

FIG. 1 illustrates a high level view of an embodiment of the flexible KPI description methodology described herein. An event processing system 100 uses the KPI configuration 102 to process data events 104 generated by a system into a plurality of KPI data events 106. The KPI configuration 102 is also used for aggregating one or more KPI data events and to produce actual KPI values.

In the context of a computer telephony system, a data event may comprise of a call detail record associated with a call. However, other events may be generated in response to network packets meeting one or more conditions. FIG. 2 illustrates examples of two data events generated in a computer telephony system. Data events can have different formatting, with the actual formatting and the actual data depending on the system generating the data events. Typically, data events consist of a set of name-value pairs. In the call detail records from FIG. 2, the set of names are listed in the left column and the corresponding set of values are listed in the right column. These call detail records include an identification (ID), a start-time, an end-time, a caller, a callee, and a voice-quality score. However, it is to be understood that the name-value pairs for a call detail record may be completely different from the name-value pairs generated in association with a completely different system or generated in association with a different event. For instance, the data event record associated with an email may include an ID, the sending-time, the sender, the receiver, and the content-type.

In accordance to one embodiment, the KPI event generation configuration is comprised of the following steps: using a set of rules for creating intermediate KPI data events from input data events, using a set of rules for configuring the KPI aggregators, and mapping between the KPI aggregators and the KPI output event streams.

Figure 3:
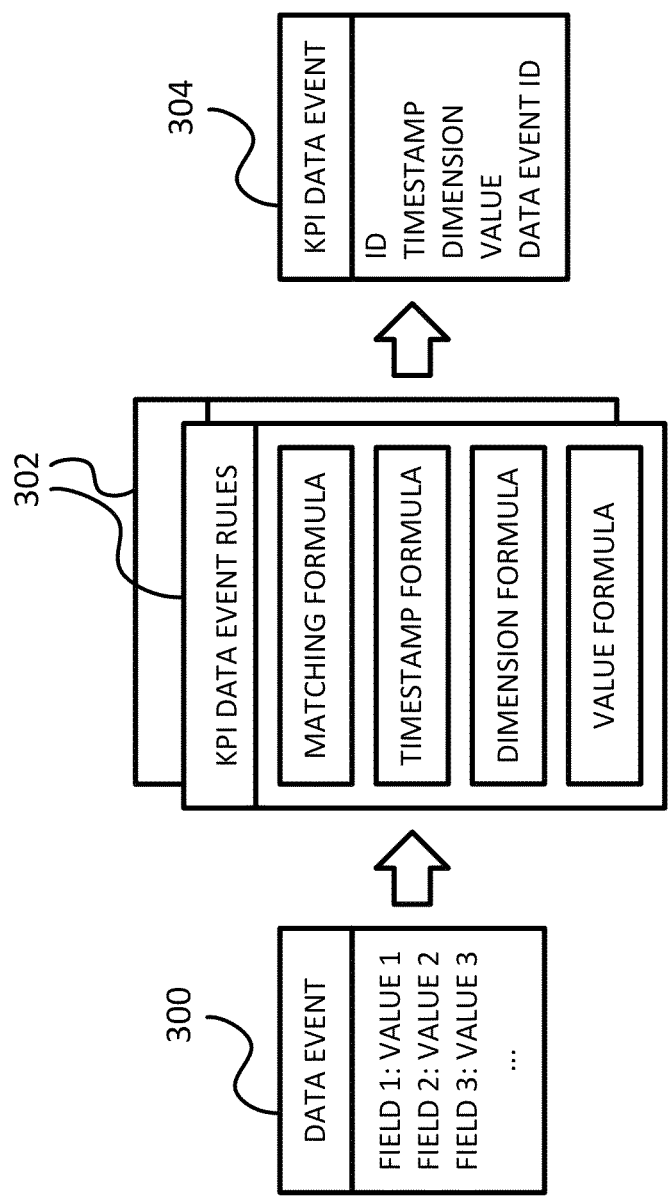
FIG. 3 illustrates the use of a set of rules to create KPI data events from input data events in accordance with an embodiment.

FIG. 3 illustrates the step of using a set of rules to create KPI data events from input data events. The data events 300, consisting of a set of field-value pairs, are processed by KPI data event rules 302. KPI data event rules 302 include the use of four types of rules to generate KPI data events 304: matching formula, timestamp formula, dimension formula, and value formula. The matching formula is used for filtering events and for matching events to particular routines that convert the event to a KPI data event. The matching formula can either match the name of a particular event or the type of the event. For instance, a VoIP system may generate an event named "SIPCALLCDR" whenever a SIP call is made, and a matching formula that matches the string "SIPCALLCDR" would detect this event. As will be explained further in detail below, matching can also be done by using regular expressions, lookup tables, and global variables, multiple different types of data events 300 may be matched to a single KPI data event 304 type, and a single data event 300 may be transformed into multiple KPI data event types 304

The timestamp formula is used to perform a calculation or matching on the timestamp of the data event. Since KPI events are emitted at periodic intervals, the timestamp of the data event and the KPI data event may be important. Matching of a timestamp may comprise determining whether an event occurred during a specific time interval. For example, if the timestamp for a particular data event indicates that the particular data event occurred in the last two minutes, then a KPI event would be generated from the particular data event. Timestamp matching can also be used to filter events based on the time of day, the day of the week, etc. The dimension formula can be used to match a particular dimension value to a particular computation or operation. The dimension formula can also be used to copy the dimension field from the data event to the dimension field of the KPI data event, to look up the dimension field in a lookup table or a global variable, etc. The value formula is used to compute the value of the KPI data event based on one or more fields of the data event, based on lookup tables, based on global variables, or a combination of these. The formula notation used for the KPI configuration can make use of global system variables, lookup tables, named fields from data events, named fields from KPI data events, named fields from KPI events, user defined variables, and user defined operations.

The data event ID formula can be used to drilldown to other information. For example, with certain KPI events, such as those that show an undesired value (i.e., MOS too low for a customer or something similar), the user may want to find all the contributing data events that were aggregated into a particular KPI value because the data events naturally contain much more information and diagnosis of a problem may be easier to perform based on the broader data set from such data events. In an embodiment, a unique ID (the data event ID) is assigned to each data event, which is then stored with each KPI data event. For a certain KPI event, the type (name) of the KPI will be known, the time period that got aggregated will be known, and even the dimension instance will be known. Using this information, all the KPI data events that "built" this KPI event can be drilled down to, i.e., found, in the storage. Since these KPI data events all have the ID of the original data events, the exact set of them that contributed to this particular KPI event can be found in the storage.

Figure 4:
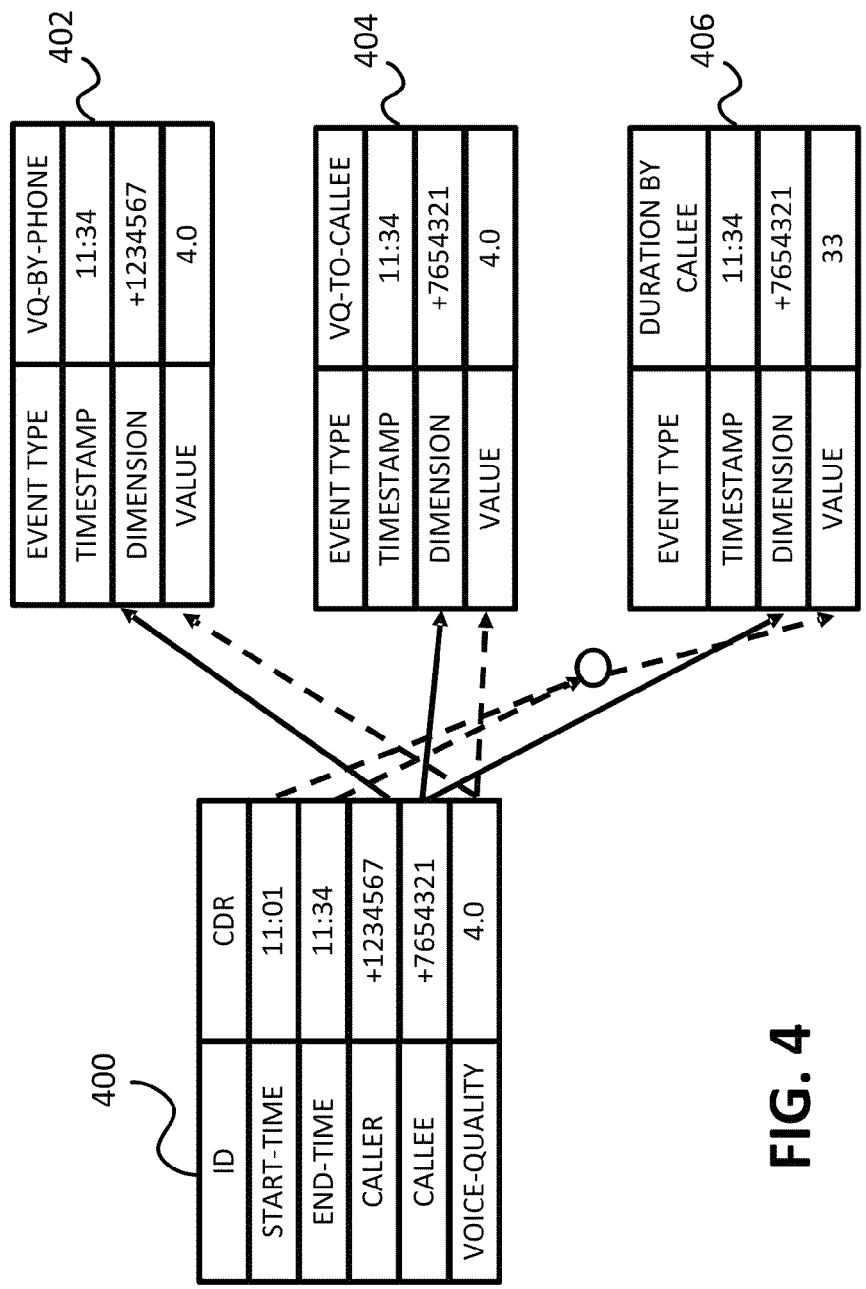
FIG. 4 illustrates a single data event resulting in three KPI data events in accordance with an embodiment.

FIG. 4 illustrates an example of a single data event 400 (shown on the left side of the figure) resulting in three KPI data events 402, 404, and 406. KPI data events are intermediate pseudo-events generated from data events for the purpose of KPI calculation. Each KPI data event may contain the following fields: an event type, a timestamp, a KPI dimension value, and a KPI data value. Depending on the type of data associated with the system generating the data events, the dimension field may consist of numeric data, character data, string data, a list, a combination of these types of data, or some other type of data. Similarly, the value field may consist of numeric data, character data, string data, a list, a combination of these types of data, or some other type of data.

In FIG. 4, the data event 400 (on the left side of the figure) results in three KPI data events 402, 404, and 406 (on the right side of the figure) after the KPI data event rules are applied. The first KPI data event 402 has a type of "vq-by-phone", with this event type representing voice-quality by phone. The timestamp field contains the timestamp for the end-time of the call. The dimension for the first KPI data event 402 is the phone number of the caller, and the value of the KPI data event is 4.0. The value of the KPI data event indicates the voice-quality score associated with the call.

The second KPI data event 404 contains the voice-quality for the callee. Both the first KPI data event 402 and the second KPI data event 404 are generated from the data event 400 by copying the values of the fields from the data event 400. The third KPI data event 406 is generated by performing a calculation of the duration of the call, rather than copying the values of fields from the data event 400, which takes the difference between the start-time and the end-time of the call. It is to be understood that any field from the data event 400 can be used to populate and calculate the values of fields of KPI data events. For instance, a calculation may first check the timestamp value, and if both the timestamp value meets a first set of conditions and if field A meets a second set of conditions, then field B and field C from the data event may be summed together.

Depending on the set of rules, some data events may not produce any KPI data events at all, such as a result of not meeting some of the matching criteria. This can be useful for event filtering, such as producing KPI data events for calls longer than 10 seconds, producing KPI data events for devices in the network of carrier A, etc. Another example of event filtering includes dropping all KPI data events that have either a dimension or value set to a specific value, or even a special value such as "null."

Data events of different types may also result in generation of KPI data events of the same type and contribute to the calculation of a single KPI. KPI data event abstraction also allows for clear conceptual separation between how KPI aggregation is performed and how raw KPI data is extracted from input data events. For example, a KPI data event named "call-duration-by-phone-number" can be generated from both SS7 and SIP call detail record data events, contributing to a unified KPI for "call-duration-by-phone-number." Therefore, embodiments of the claimed invention allow for the generation of uniform KPI data events by aggregating heterogeneous data events. That is regardless of how a first data event may be generated or formatted, and regardless of how a second data event may be generated or formatted, these two data events can be processed and aggregated by using the KPI data event rules. In particular, if the administrator of a network has created rules to process events generated by probes on the network, the administrator can add a different type of probe to the network, which generates data events in a different format and containing different data than the existing probes. Using the KPI configuration described herein, the user can create rules that not only process the data events from the new probe, but that also aggregate the data from the new probe with the existing probes using the KPI configuration and KPI data event rules.

Figure 5:
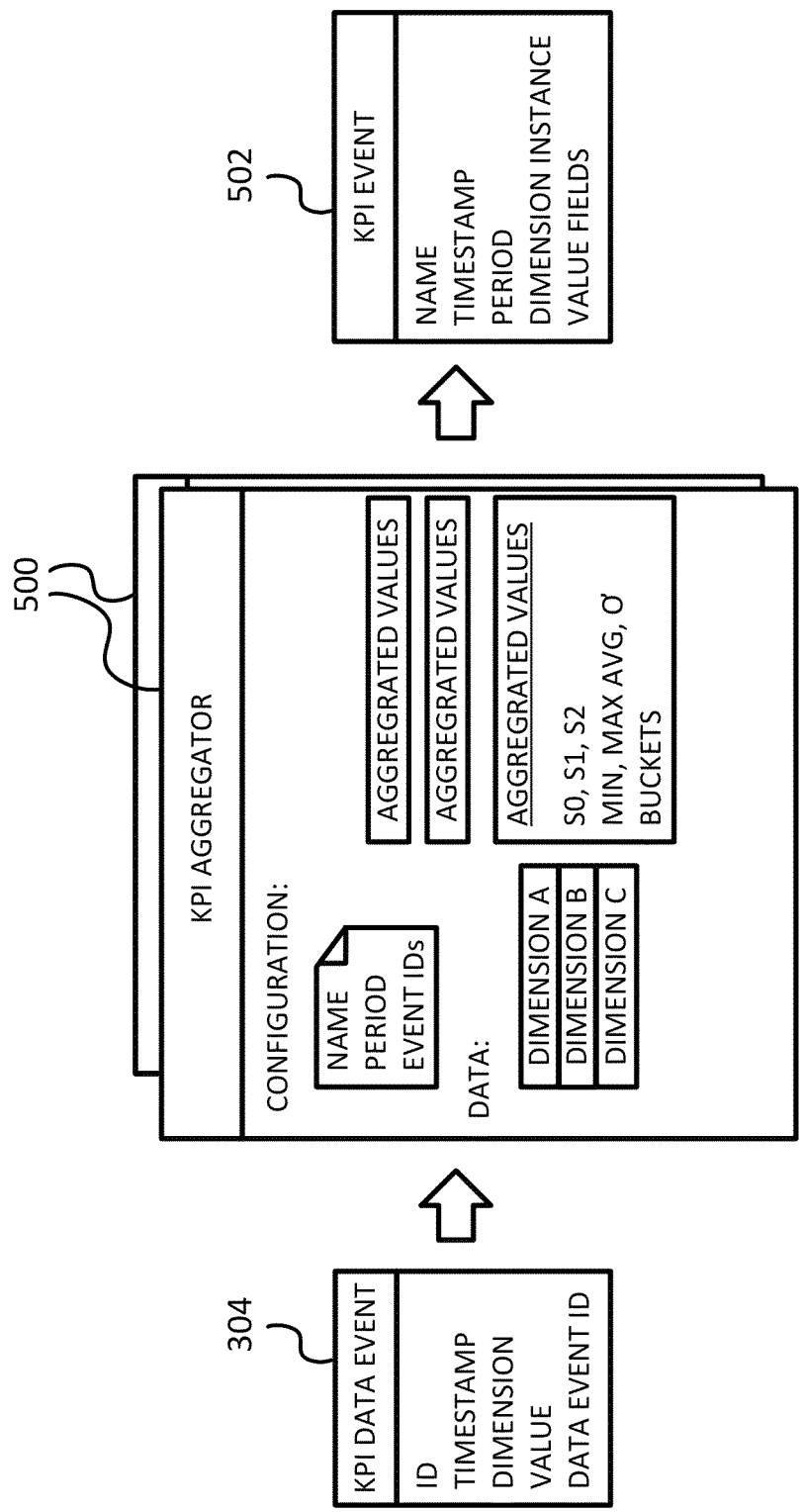
FIG. 5 illustrates mapping between a KPI data event and an aggregated KPI event via KPI aggregators in accordance with an embodiment.

FIG. 5 illustrates the mapping between KPI data events 304 and aggregated KPI events 502 via KPI aggregators 500. KPI data events 304 may consist of a set of name-value pairs (also referred to as field-value pairs), with the fields including an identification field for the KPI data event, a timestamp field, a dimension field, and a value field. The KPI aggregator 500 uses a set of configuration rules to process a plurality of KPI data events 304 that occurred during an aggregation time period. The configuration of KPI aggregators can include rules indicating the name of events to be processed, the time interval for which events are being processed and aggregated, the event IDs to be processed, etc.

The aggregated KPI events 502 generated by aggregators are comprised of a set of name-value pairs including a name for the KPI event, a timestamp, an aggregation time period, a dimension instance, and aggregated value fields, such as minimum, maximum, mean, standard deviation, buckets, etc. However, alternative embodiments may include other name-value pairs. In the computer telephony system example, the KPI event name may be the call duration by phone number, the aggregation time period may be one day, the dimension instance may be a phone number of a first user, and the aggregated value field (representing the call duration by the user) may be 5 minutes. An aggregated KPI event 502 may also have an identical structure to a KPI data event 304, with the difference being that the values of the KPI event 502 are populated by performing aggregation of values on data from a plurality of KPI data events 304. However, because the aggregated KPI event 502 may have an identical structure to a KPI, it is to be understood that an aggregated KPI event 502 can subsequently be aggregated with KPI data events 304 and other aggregated KPI events 502, depending on the configuration and rules specified by the user. For example, the aggregated KPI events could be subject to operations similar to those described with regard to KPI data event rules 302 of FIG. 3, with the KPI events being used as the data events and resulting in new KPI data events.

The KPI events and KPI data events may have the same type or different types. A multi-dimensional KPI may be created by defining a dimension operation, such as described with respect to the dimension formula of KPI data event rules 302 of FIG. 3, so that multiple value fields are selected from the name value set of a particular data event type. For example, as illustrated in FIG. 4, the dimension operation can be defined as "Caller+Callee" for "VQ-BY-PHONE", which would yield a multi-dimensional KIP data event of:

TYPE=VQ-BY-PHONE
TIMESTAMP=11:34
DIMENSION=+1234567:+7654321
VALUE=4.0

A multi-dimension KPI may also be simulated by concatenating multiple KPI dimension values into a single KPI dimension value. For the KPI event resulting from the aggregation of the two KPI data events illustrated in FIG. 4, the string "+1234567:+7654321" may be used to represent by-"caller"-by-"callee" dimensions.

Multi-dimensional KPIs restrict data further when compared to single dimension KPIs. For example, a first single dimension KPI may calculate the average quality of experience by customers. A second single dimension KPI may calculate the average quality of experience by service providers. If during monitoring and testing of one or more networks it was found that a particular customer had a bad quality of experience (QoE), then a multi-dimension KPI could be used to determine whether the bad QoE was dependent on the service provider. A multi-dimension KPI could be used to obtain a KPI for the Average QoE by Customer by Service Provider. The use of concatenation allows the same implementation used for single dimensions to be used with multiple dimensions, since the system would only see a single string at any one time. Multi-dimensional KPI's, however, have higher cardinality in their dimensions. For example, if there a one million customers and ten service providers, there may be ten million new dimensions instances for the multi-dimensional KPI.

A KPI aggregator is configured to receive KPI data events with particular IDs or types, sort the KPI data events by the dimension value, and performs aggregation calculations based on KPI data values. As indicated above, KPI events are the result of this aggregation for particular time intervals. While the timestamp in KPI data events is used to identify a particular KPI data event within a proper interval, the ID of KPI data events is used to determine whether a particular aggregator should aggregate the event with other events.

During aggregation operations, the KPI aggregator can process all the events within the same interval in the same way. Alternatively, a KPI aggregator may process certain events using a first set of operations and other events using a second set of operations. A KPI aggregator can also combine KPIs from different event types. For instance, SS7 and SIP KPI data events can be aggregated into a generic KPI for calls (regardless of the communication protocol used). Finally, as noted above, the behavior and operations performed by the KPI aggregator can all be configured by the user by specifying the aggregation rules or by modifying these rules to meet the user's needs.

The rules and formulas for computing the aggregations are defined using the same flexible configuration methodology used to map data events to KPI data events. Sets of KPI data events can be aggregated based on KPI calculation produces using user defined time intervals for the aggregation periods, such as once a minute, once an hour, etc. The aggregated set contains aggregated information for every KPI dimension encountered during the specified time period.

The configuration methodology enables a wide range of aggregation operations to be used and defined by the user. For example, a first aggregation operation can count the number of received KPI data events, a second aggregation can sum the values for a particular dimension from a plurality of KPI data events, a third aggregation can sum the squares of the values for a particular dimension from a plurality of KPI data events, etc. Other aggregation operations include determining the minimum value for a dimension from a plurality of KPI data events, determining the maximum value from the plurality of KPI data events, determining the largest N values from the from the plurality of KPI data events, determining the smallest N values from the plurality of KPI data events, determining the average of the values from the plurality of KPI data events, determining the standard deviation, and determining the value distribution of the values from the plurality of KPI data events into a predefined number of value buckets. Other aggregation statistical operations include determining the median, the mode, quartiles, and outliers. Selection algorithms can also be used to limit the number of individual dimension values reported by a KPI aggregator. For instance, the k smallest values or the k largest values can be retrieved from the values of a set of KPI data events.

KPI aggregators are not limited to aggregating values for a single dimension. In one embodiment, a KPI aggregator can aggregate values from two or more dimensions. In addition, a KPI aggregator can aggregate values from a single dimension based on whether the values from a different dimension meet one or more conditions. As aggregation operations are flexible and configurable by a user, they are not limited to statistical operations. For instance, an aggregation operation may comprise of summing the values of a particular dimension whose value is less than a threshold value. Embodiments can also consist of a single KPI aggregator that aggregates values from a plurality of KPI data events and for a plurality of dimensions. Alternatively, two or more aggregators can be configured, with each aggregator aggregating values from different KPI data events or aggregating values for different dimensions.

During the aggregation operations, a KPI aggregator can store KPI data events as objects in a list, with the aggregator aggregating the values in the list at the end of the aggregation time period. The aggregator can also extract the data from the KPI data event, storing each name-value pair from the KPI data event into a list, rather than storing each KPI data event as an object. The aggregator can also extract specific data from the KPI data event, while discarding the rest, or saving some identification information associated with the extracted data in case it was needed at a later calculation step to determine where a piece of data came from.

FIG. 5 illustrates the aggregator maintaining aggregated values for various dimensions, including dimension A, dimension B, and dimension C. For each dimension, values can be aggregated in a plurality of ways as indicated above, including counting the number of events, the minimum value, the maximum value, the average value, the standard deviation of the aggregated values, and the distribution of the values into a number of predefined buckets.

FIGS. 6-9 illustrate various examples of an embodiment of a set of rules and formulates used to map data events to KPI data events, and to map KPI data events to aggregated KPI events. The examples presented use the Extensive Markup Language (XML) to define the set of rules for generating KPI events from data events. It is to be understood that any other data serialization format can be used, preferably a human readable format. For example, rather than using XML, alternative formats that can be used include comma-separated values, JSON, S-expressions, and YAML, among others.

FIGS. 6A-6C illustrate a set of rules used to map data events to KPI data events. In FIG. 6A, the rule consists of a "kpi-data" element, with the kpi-data element having two child elements: "dimension" and "value". The kpi-data element and the two child elements each have attributes. The "name" attribute of the kpi-data element indicates the name for the KPI data event (in FIGS. 3 and 4 above, the name attribute was referred to as the ID), and the "edr" attribute indicates the name of data events that are matched. The edr attribute allows the user to indicate a rule for matching the ID or the name of an event data record. That is, any event data record having an ID labeled "ss7.CallCdr" would be processed by the rule from FIG. 6A. As noted above, matching can be performed in various ways. The user can specify an exact string to be matched, such as "ss7.CallCdr". Alternatively, the user can use regular expressions to match the IDs of event data records. For instance, the expression "*.CallCdr" would match any event data record that ends with the string ".CallCdr", which would match strings such as "ss7.CallCdr", "sip.CallCdr", "sccp.CallCdr", and "helloworld123.CallCdr".

The dimension child element, declared inside the kpi-data element, specifies the value for the dimension field of the KPI data event. The example from FIG. 6A illustrates the use of named fields from the data event to calculate the value of the fields of the KPI data event. Specifically, the attribute "field-Name" denotes the name of a field from the data event, and the attribute "op" specifies the operation to be performed to generate the dimension value of the KPI data event. The "copy" operator indicates that the value of the field "region" from the event data record is copied to the dimension field of the KPI data event. The value of the KPI data event is a constant set to a value of 1.

The example from FIG. 6A indicates that the KPI data event named "ss7.NumCallAttemptsPerRegion" is generated by matching every event data record with an ID of ss7.CallCdr. The resulting KPI data event will have a dimension value equal to the region value from the data event and will have a value equal to 1. In other words, the rule from FIG. 6A creates a KPI data event with a value of 1 whenever a call is made within a specific region. The rule from FIG. 6A creates a plurality of KPI data events every time a call is made, with each KPI data event recording the region associated with the call. If it was desired to count the number of calls made per region, a KPI aggregator would count the KPI data events for a first region, count the KPI data events for a second region, and so on.

FIG. 6C illustrates a rule similar to the rule from FIG. 6A, generating a KPI data event whenever a SIP call is made, with the KPI data event having a dimension value equal to the region where the call was made and having a value equal to 1.

FIG. 7 illustrates a rule used to define a KPI aggregator that aggregates KPI data events having an ID equal to "sip.NumCallAttemptsPerRegion" and "ss7.NumCallAttempsPerRegion". In the KPI aggregator rule, the "data" child elements (declared inside the "kpi" element) indicate the name of the KPI data events being aggregated. In the kpi element, the attribute "name" defines the name of the KPI aggregator. The attribute "period" defines the aggregation time period. In this case, the aggregation period is defined in seconds, with 120 resulting in a two minute aggregation time period. The "valueType" attribute specifies the type of the value of the KPI aggregator, in this case being an integer or other number.

The "keepMode" attribute defines which values are aggregated and which values are excluded from the aggregation. For example, the "keepMode" attribute may be used to run Top-N (or Bottom-N) selection algorithms on the stored (dimension instance—value) pairs. In FIG. 7, for "keepMode=all", all dimension instances may be kept during the aggregation period and all may be emitted at the end. A user could also specify that only the highest (or lowest) N values may be kept during the aggregation using the Top-N or Bottom-N selection algorithm. This may be useful when tracking "too many" dimension instances. For example, for a KPI that tracks the quality of experience for subscribers, it does not make sense to keep track of possibly millions of subscribers, it is enough to track the ones that are having the worst experience. The keepMode attribute could also be used in other ways. For example, for "keepMode=removeOutliers", all outliers of the KPI data events would be removed from the aggregation operation. Alternatively, the user may have created a keepMode called "specialDrop10th", which drops the 10th KPI data event from the aggregation operation.

Finally, the "keepSelector" attribute defines the aggregation operation, which may be the name of a number of pre-defined aggregation operations or it may be the name of a user defined operation. In this case, the operation "count" aggregates the KPI data events by counting the number of KPI data events. However, the operation may alternatively have been "max", "min", "average", "top 5", "bottom 3", "stddev", etc.

FIG. 8A illustrates configuration for the KPI output for the KPI "NumCallAttemptsPerRegion" from FIG. 7. The configuration allows the user to specify the name of the file where the output is to be stored, along with specifying the ordering and formatting of the data as it is outputted. The rules also enable the user to specify all the results, or portions of the results, to be written to different files. FIG. 8B shows the actual output, including headers for the data and followed by rows of comma-separated values.

FIG. 9A shows another example of a rule that processes SIP event data records. The rule shows an example of using global system variable, "voip.BadMosThreshold", for the calculation of the values of the KPI data event. Placing the global system variable inside the curly brackets and with the dollar sign—{variable_name}—indicates to the parsing engine that the string inside the curly brackets is a variable, and it results in the value of the variable replacing the string. For instance, if the value of the variable voip.BadMosThreshold was 3.5, then the expression in FIG. 7A would result with the expression being replaced with "value=3.5". The rule from FIG. 7A also shows an example of an "and" operation, where the two elements inside the value element are evaluated, and if both of these expressions are true, the value of the KPI data event is set to 1, and if at least one of the expressions is false, then the value is set to 0. The first "expression" child element performs the operation of checking whether the field mos_score is greater than 0.0. The second "expression" child element determines whether the field mos_score is less than the value stored in the voip.BadMosThreshold global variable. Therefore, the rule processes an event data record for a call, and if the MOS score of the call is greater than 0 and less than a bad MOS score threshold, then the value of the KPI data event is set to 1. A KPI aggregator can then be configured to count all KPI data events with an ID of sip NumBadMosPerCustomerAll and with a value of 1 to determine the number of calls by customers that received bad MOS scores.

FIG. 9A also illustrates the use of references to user defined operations or expressions. That is, if the user found the need to define a new operation, then the user would be able to create a new operation, assign a name to the new operation, and be able to use the operation by simply invoking it by name. The element "dimension" includes the attribute "ref" with a value of "kpid.Customer." The "ref" attribute enables the user to invoke an operation defined by the user. Specifically, the "kpid.Customer" operation is defined in FIG. 9B.

The expression from FIG. 9B illustrates the use of lookup tables for calculations. The attribute "lookupName" indicates the table name, and the attribute "index" indicates the index of the table from which a value is being retrieved. If the table consists of a plurality of name-value pairs, then a particular index would correspond to the value of a particular name-value pair. Similarly, if the table consists of a plurality of rows and columns, then the two indexes can be specified, with one index referring to the row and the other index referring to the column, thus allowing for retrieval of specific values from the table. The index notation can also enable the user to specify one index for either the row or column, and leave other the other index blank, allowing for an entire row or column to be retrieved. Slicing of tables, and indexing and retrieval of specific values or sets of values from tables is well known in the art.

Yet another embodiment is directed to a method for automatically calculating KPI thresholds in a monitoring product by using self-learning triggers based on KPI values considered to be normal (values observed during normal conditions), and adaptively triggering alarms to indicate deviance from normal conditions. The alarms are generated without needing a user to configure, or have knowledge of, the conditions required to generate those alarms.

For instance, in the context of monitoring VoIP calls, embodiments described herein automatically learn that a normal Mean Opinion Score (MOS) for calls from carrier A is x, the normal MOS for carrier B is y, etc. After these values have been determined, the system may automatically trigger alarms when calls with MOS values below (or above depending on the context) those levels are detected. These learned values can also be time dependent. For example the system can learn the "normal" values for a tested function, such as "Busy Hour" and "Off Times" and use the KPI aggregators to compare against these at the appropriate times.

In an embodiment, the direction of deviance can also be learned automatically, as further described below. For example, MOS is an industry standard metric for measuring QoE having a scale of 1-5. A standard rating scheme of MOS is presented in the table below, where 5 denotes an excellent call quality, while 1 denotes a bad call quality.

| MOS Rating | Description |
| --- | --- |
| 5 | Excellent—Imperceptible |
| 4 | Good—Perceptible but not annoying |
| 3 | Fair—Slightly annoying |
| 2 | Poor—Annoying |
| 1 | Bad—Very annoying |

Although reference is primarily made herein to MOS, there are other metrics that may be used for measuring QoE, such as the R-factor, which has a scale of 1-100. The R-factor may be included as a field of a data event. R-factor is one of a number of alternative methods of assessing call quality. Scaling from 0 to 100, as opposed to the limited MOS scale of 1 to 5, makes R-factor a more precise tool for measuring voice quality. MOS ratings can be further broken down by tenths to create a broader scale and compared to the R-factor on a relative basis, as set forth in the following table.

| Description | MOS rating | R-factor |
| --- | --- | --- |
| Very satisfied | 4.3-5.0 | 90-100 |
| Satisfied | 4.0-4.3 | 80-90 |
| Some users satisfied | 3.6-4.0 | 70-90 |
| Many users dissatisfied | 3.1-3.6 | 60-70 |
| Not recommended | 1.0-2.6 | Less than 50 |

Returning to the example of the direction of deviance being learned automatically, take the situation where the system may generate values between 3 and 4 while the normal values for MOS are being learned, resulting in an average between 3 and 4. In reality, a score of 5 is practically impossible on most VoIP networks, so the top score may not be a 5. For example, a "best" MOS score on a VoIP network may be 4.19 for the G.711 codec. If a score of 4.19 was received after normal values of between 3 and 4 had been learned, then a score of 4.19 would be flagged as falling outside the range of normal values. However, in this case a score of 4.19 would not be a cause for concern, because it is a very good MOS score, so there would be no need for a user to receive an alarm for receiving an excellent MOS score. Hence, the system could automatically adapt a trigger so that an alarm was not triggered even though the deviation from normal was outside of the normal range that had been learned because the deviation was good, not bad.

In a particular embodiment, the user can manually specify whether deviation from the normal values in a particular direction will or will not trigger an alarm, or alternatively specifying the particular direction in which alarms are to be triggered. For instance, for MOS, the user can specify that after a normal value has been determined, that values that deviate from the normal value and that are less than the normal value trigger alarms, while values that deviate from the normal value and that are greater than the normal value do not trigger alarms.

Embodiments of the self-adaptive trigger method simplify the configuration of monitoring products. In many cases, the user of a monitoring product wishes to be notified when something abnormal occurs, but the user may not always have the knowledge needed to specify what the normal conditions are. In addition, having a system that automatically updates the conditions considered normal reduces the maintenance burden on the user since it removes the need for the user to constantly monitor the conditions of the system and the need for manual reconfiguration of the system as the normal conditions change. Instead, the system can constantly monitor the conditions and update what constitutes "normal" over time, thereby automatically adjusting the triggers for alarms when there are certain deviations from normal. In addition, normal conditions under one system do not generally translate to normal conditions under a different system. For example, a user may be familiar with normal conditions with a first carrier, but these conditions may be completely different from the normal conditions with a second carrier.

Depending on the type of system and data monitored by a monitoring system, there may be a large number of different KPIs associated with a single system. Thus, while users may be interested in tracking a large number of different KPIs, it is a burden to have to manually configure the thresholds for each KPI. Automatically determining the thresholds associated with the different KPIs simplifies the system configuration. Embodiments also reduce the possibility of having alarms raised or missed due to misconfiguration.

In an embodiment, when a monitoring system is first configured, the user is presented with a list of KPIs that can be tracked by the monitoring system. If the user needed a KPI that was not included on the list, then the user may use the configuration methodology described above to define a set of rules for computing a new KPI. After the user selects the KPIs to track, she may then specify an initial period of time during which the system will monitor all the events on the network. At the end of the time period, the system may generates what are considered normal values for all the KPIs.

At any time the user can view the normal values using the system's user interface. For instance, the user can view what is a normal MOS for calls to carrier x through the system's user interface. The customer can also define for each KPI the deviation from the normal value that would trigger an alarm. The deviation can be specified as a percentage or as a numeric value, or something else depending on the unit of measurement of the KPI. The deviation can also be specified using a set of rules that includes conditional statements. For instance, if the KPI has deviated from the normal value for longer than five minutes, then send an alarm. If the KPI has deviated from the normal value at least five times in the last 24 hours, then send an alarm. The rules can also be used to specify which user receives the alarm. For instance, if a first set of conditions are true, then send the alarm to a first user, and if a second set of conditions are true, then send the alarm to a second user.

In one embodiment, the system can have default deviation values for KPIs that are based on percentage values. As will be explained below, the system may learn the deviation values for such KPIs. Setting absolute default values for KPIs based on different units of measurement may not be appropriate.

Alerts can further trigger responses associated with the alerts. The response can trigger one or more actions that can be used to resolve the issue that triggered the alert, to inform the user with a corresponding report, or to perform damage control until the user or administrator has time to troubleshoot the system. Alerts can include sending a notification to a particular user, such as a system administrator, via text-based or voice messages. In addition, the alert can trigger the execution of a script or a sequence of steps used to resolve or mitigate the original issue. For example, if a switch is identified to be dropping packets, then the executed script or sequence of steps can reroute traffic by using a different switch until the switch flagged as the source of the problem is fixed. The alarms can be delivered as an email, a text message, a voice message, an instant message, or a multimedia message. The content and the preferred type of delivery can be specified by the user. In addition, the user can indicate that a first user receives an alarms associated with a first KPI and a second user receives alarms associated with a second KPI. The user can also indicate that deviations within a first range trigger alarms sent to a first user, while deviations within a second range trigger alarms sent to a second user.

The logic of the system may be used to determine when normal KPI values should be updated and to determine which events should and should not be used to update the normal KPI values. For instance, events that fall outside of what is considered normal KPI values may not be taken into consideration for updating the normal KPI values. Alternatively, if a KPI value falls outside of the range of normal KPI values, but if it falls within a number of deviations or within an extended range from the normal KPI values, then the KPI value may be used to update the normal KPI values. The logic can also specify that if the KPI value is an outlier, or within a number of deviations or outside of range of KPI values that might require updating, then the KPI value is used to raise an alarm, but it is not used to update the KPI values. The logic can also specify that if a number of outlier KPI values are detected, with the total number of outliers exceeding some threshold, then the KPI values considered to be normal are to be updated.

The timing associated with the system's evaluation or learning of data events and the establishment and/or updating of normal KPI values may be important in terms of developing normal KPI values that can result in triggers for alarms and those that do not. In this regard, it may be necessary to be able to detect periodic data events in the network that affect KPI values and "permanent" changes in the network that will affect KPI values. Many of the changes that occur in a network are periodic in nature, such as changes in call volume. There may be short term changes, such as between day time call volume and night time call volume. There may be longer term changes, such as changes from one day of the week to the next, say a Sunday to a Monday, or one week to the next, and there may be much longer periods, such as a year, where once a year there is a significant increase in call volumes due to a particular holiday.

In one embodiment, the user can manually specify the time period to use for learning KPI values that may result in normal KPI values or updated KPI values. For instance, if the normal KPI values were determined from an initial one week learning period, and the normal KPI values were updated based on the KPI data from the initial one week and from the data from the following three weeks, then the user may determine to exclude the KPI data from one week, or one or more days, from the calculation of the normal KPI values. That is, KPI values are stored not only to establish the normal KPI values, but also to enable the normal KPI values to be updated, and to enable the user to specify time periods from which normal KPI values can be computed. This can be especially useful if there was a time period where uncharacteristically poor data was gathered. For example, if a KPI measures dropped packets in a network, and a failed router caused an uncharacteristically large number of packets to be dropped during a one week period, then the user may decide to not use the data from that particular one week period for the normal KPI value calculation. This selection can be specified by the user by entering a data range. Alternatively, the KPI values can be presented visually to the user as a line graph, or using some other visual representation, with the Y coordinate representing the KPI score and the X coordinate representing the time period. The user could then use the mouse to manually select the periods which should be used to compute the normal KPI values.

Clustering can also be used to identify normal KPI values. Common types of clustering algorithms include hierarchical algorithms, partitional algorithms, and subspace clustering methods.

In an embodiment the KPI values are automatically learned and automatically updated without user specified time periods. As noted above, some periodic time periods that may be important to learning normal values may also be so long that it is not practical to calculate normal KPI values using a set time period. For example, to detect yearly cycles, it may be necessary to use two to three years of event data to learn normal KPI values for that yearly cycle. Because learning over such an extended period of time such as this may be impractical, other techniques can be used, involving shorter cycles, to help the system learn normal KPI values for longer cycles and event data may be used once a training period is over to self-adjust or update the normal KPI values for longer cycles.

Network pattern changes can also impact normal KPI values and may be more permanent in nature. Some of these changes may be easier to predict from a logical perspective. For example, the introduction of a new network router intended to reduce traffic congestion should be expected to change some KPI values, such as KPI values based on call delays. Since such changes can be predicted, the system can be set up to expect certain changes in KPI values when such changes are made, to not trigger alarms as a result of such changes, and to automatically set up a new learning period to adjust or update the normal KPI values. As these types of changes are also within the network operator's control or view, such changes can also be anticipated and set into motion by a user at the same time the network changes are made.

Other types of changes are outside of the network operator's control or view. For example, a new television show may debut that encourages user interaction through the placement of telephone calls. A very popular show of this type can cause significant changes in call volumes across the country without warning. If the show is introduced on a Friday night, then there may be a significant increase in call volumes on Friday nights. The first time the system saw a significant spike in call volumes on Friday night, the system may trigger an alarm because the call volume significantly exceeds normal KPI values associated with the time of day and day of week. But by the next week, if the spike happened again, the system will have already learned something about this time of day and day of week data event and begin to adjust or update the normal KPI values accordingly. Perhaps the normal KPI values are not adjusted enough in just the second week to not trigger an alarm, but they could be change by some significant amount such that by the third week of the same call volume spikes, no alarm is triggered.

Adjustment or updates in normal KPI values may also be generated in other ways. For example, a user could initiate a new learning period on a periodic basis just to cause the system to reevaluate its current condition and make any updates that might be necessary. Likewise, a user could initiate a new learning period because of some outside event that would normally be understood to cause a change in KPI values, so as to make sure that the oly normal KPI values are updated and replaced with new normal KPI values. Users could also set up periods during which learning is automatically run to update normal KPI values. In an embodiment, the system is set up to always be in a learning period such that old normal KPI values are constantly being replaced with new KPI values. Weighted algorithms may be employed to determine when an old normal KPI value is replaced with a new normal KPI value so that normal KPI values are not changed as a result of the slightest of changes in the network. While a constant learning period may be the most computationally extensive method, it also requires the least interaction by a user. Normal KPI values can also be updated every KPI period. The manner in which normal KPI values are recorded and changes to those normal KPI values are reported can also vary greatly. In an embodiment, logs of can be generated when KPI values are updated, on a periodic basis, after certain types of network events, etc. These logs can be viewed using the system's user interface. Additional logs can also be generated whenever a KPI value falls outside of the normal value range, whenever a trigger is generated that results in an alarm, whenever a trigger is generated that does not result in an alarm because of a self-adjustment to trigger due to an update in one or more KPI values, etc.

In one embodiment, an average of KPI values within or after an initial learning period can be used to establish or update the normal KPI values. These averages may also be adjusted in various ways such that a modified average is used in place of any raw average to determine normal KPI value. For example, outliers in the initial learning process can be identified and discarded, and subsequently the average of the remaining KPI values can be used as the normal KPI value. Discarding outliers may consist of discarding the maximum KPI value, discarding the minimum KPI value, discarding the top n KPI values, discarded the bottom n KPI values, discarding all values greater than the upper quartile, discarding all values less than the lower quartile, discarding values based on other selection methods, or any combination of these methods.

When using the average of various KPI values to define a normal KPI value, the standard deviation from the normal KPI value can be used to determine whether a KPI value is considered normal. A multiple of the standard deviation can also be used. Alternatively, a percentage from the average can be used to determine whether a KPI value falls under the range of normal KPI values. For instance, the user can specify that any number that is less than or greater by 5% than the normal KPI value is not considered a normal KPI value. The deviation from the normal KPI value can also specified by indicating a numeric value by which a particular KPI can deviate from the normal KPI value. For example, if the normal KPI value is found to be 3.8, then the user may simply specify that values less than 3.0 are not considered normal and should raise an alarm.

In an embodiment, a range of values is used to specify normal KPI values without computing an average or a standard deviation. For instance, the user may simply specify an initial learning period. At the end of the initial learning period, the maximum and minimum KPI values found during the initial learning period can be used to define a range of normal KPI values, with any KPI value between the maximum and the minimum being considered a normal KPI value. The maximum and the minimum can also be found after some data processing has been done, such as removing of outliers. The upper quartile (or some other upper percentile) can also be selected as the maximum of the normal KPI value range and the lower quartile (or some other lower percentile) can be selected as the minimum of the normal KPI value range. The user may also manually specify a default maximum and a default minimum value for the normal KPI value range which is subsequently updated during the initial learning period or at the end of the initial learning period. The system may also have a set of default maximum and minimum values. As indicated above, in embodiments that use a maximum and a minimum value to define the normal KPI value range, any KPI value exceeding these thresholds would triggering an alarm.

In an embodiment, KPI values can be transformed, and the determination of normal KPI values can be based on the transformed data. For instance, each KPI value during the initial learning period may be transformed using a function, such as $y=f(z)$, where f is the transformation function, z is the current KPI value, and y is the transformed KPI value. After the KPI values gathered during the initial learning period are transformed with the function, a normal (transformed) KPI value can be computed based on the transformed data. The average of the transformed KPI values, or any other method used to learn normal KPI values, can then be used to compute a normal KPI value. During monitoring of KPI values, the KPI values would be transformed using a transformation function, and compared to the transformed normal KPI value.

The ability to transform KPI values may be useful, for example, when it is desirable to perform a certain type of threshold comparison based on KPI values, but the KPI values to be used are not appropriate for that type of threshold comparison. As a further example, an expected KPI value distribution may not fit very well when used in a deviation algorithm based on a standard deviation, percentage calculation, etc., i.e., it may only make sense to use a standard deviation when the KPI values are normally distributed values. By enabling a user to specify a transformation for the KPI values that transforms the KPI values to something else, such as derived values with statistical properties that better fit available thresholding methods, it may be possible for the user to avoid having to use more sophisticated thresholding methods.

Yet another embodiment is directed to an intelligent sequencing of events in a monitoring product. From herein the system used to implement the intelligent sequencing of events will be referred to as "the sequencer." The sequencer tracks and sequences events in real time, as they are recorded on the network, or as fast as possible. The sequencer also distinguishes between different types of events, including events where the timestamp of the events is important and events where the timestamp is of no importance. In one embodiment, the sequencer can mark important events with a special timestamp, indicating that these events should be forwarded as soon as they are detected to the application consuming the events. The sequencer may choose to continue sequencing events from the same input source even if that input source has events that occurred before events in any other input source. The sequencer may also wait for a slow input source before moving on to another input source.

In an embodiment, a monitoring product (from herein referred to as "the application") processes data records, consisting of events, that it receives from multiple input sources. Each input source independently and asynchronously produces a stream of events in local order. However, when the application processes events, it is important that they are processed in absolute order. In one embodiment, events which are processed by the application describe real network events triggered by a network monitoring software. In this case, each input source receives events from different parts of the network. Each input source may independently receive events which are related to events received by another input source. These events can be time sensitive and the ordering of events can make a difference to both the correlation of events and to determining causality among related events.

FIG. 10 illustrates two input sources containing locally ordered events, with these events being communicated to an application. Input source 1 contains events in the order of 1, 3 and 6. Input source 2 contains events in the order of 2, 4, and 5. When these events are received by the application, these events are to be ordered in the absolute ordering: 1, 2, 3, 4, 5, and 6. For instance, input source 1 may be associated with a first VoIP device, with the input source 1 monitoring and tracking events associated with the first VoIP device. Similarly, input source 2 may be associated with a second VoIP device, with the input source 2 monitoring and tracking events associated with the second VoIP device. The first VoIP device may initiate any type of call, such as a VoIP call using the Session Initiation Protocol (SIP), by sending an invite to the second VoIP device. The input source 1 would detect the SIP invite as an event, adding the SIP invite event to a first-in-first-out (FIFO) queue. The input source 2 receives the SIP invite and also adds this event to its local FIFO queue. The SIP invite is then received by the second VoIP device. The sending of the SIP invite by the first VoIP device and the receiving of the SIP invite by the second VoIP device would then result in events labeled "1" and "2". Thus, when the sequencer receives these events from the input source 1 and from the input source 2, it is important that the sequencer order the events such that event 1 is ordered as the first event, and event 2 is ordered as the second event.

It is noted that due to network conditions, such as network latency and other factors, the sequencer may receive the events from the various input sources in different orders. For instance, the sequencer may receive all of the events from the input source 2 before it receives any events from the input source 1. The sequencer is therefore responsible for determining the time at which events are processed by the platform and ensuring that events, even if received asynchronously and out of order, are eventually ordered into an absolute ordering.

Events are sequenced using their timestamps. When the platform is started, the input adapters begin to retrieve records from input sources and generate data records from the input sources. After an initial delay, the input sources are ordered based on their top timestamp, the timestamp of the first event ready to be processed. In embodiments, the sequencer then continuously does the following: (1) looks at the input source with the top timestamp and waits, if needed, before processing events, (2) processes one tick of data (all events with the top timestamp) from the input source with the top timestamp, and (3) re-orders the input sources based on their top timestamp. The tick may be one second, two seconds, a microsecond, or any other valuable specified by the user through configuration.

FIG. 11 illustrates an embodiment where an application 1100 receives related events from two different input sources 1102 and 1104 through network clouds 1106 and 1108. Each input source 1102/1104 receives related events associated with two different legs of the same call from phone 1110 to phone 1112 through cloud 1114. The application may also simultaneously be receiving other related or unrelated events from other input sources distributed across the network. Embodiments of the sequencer described herein enables these events to be processed in absolute ordering, consequently enabling the application to properly process the data associated with these events. The sequencer also addresses the variable delay in receiving related events from different input sources located in different parts of the network.

The sequencer can process events at the same speed as they are generated, but with a configured delay that may account for possible delays in retrieving data from input sources. The sequencer can also control the speed at which events are processed by the application, including a real-time speed and a "fast as possible" speed. Real-time refers to the period of time between events as they are received by the application being the same as the period of time between events when they were generated (plus or minus a "tick" granularity). Even if there are inherent delays in the system which cause events to be received by input sources or the sequencer in non-real time, the application receives the events in real-time. The sequencer thus has the ability to dejitter events to ensure that real-time playback speed is maintained (after an adjustable delay).

In the case of pre-recorded events, the sequencer may play back events in a multiple of real-time or in an "as fast as possible" mode, while maintaining absolute event ordering. Input sources receive feedback on the operation of the application which affect their operation in the multiple-of-real-time or "as fast as possible" modes. The sequencer also has the ability to play back pre-recorded events at a later time while maintaining absolute ordering and ensuring real-time playback speed. Thus, rather than retrieving values from the input sources as events are generated, the sequencer has the ability to playback events with absolute order and with an accurate playback speed based off the event data records as observed by the network monitoring product. If it is desired to play back the same sequence of event data records at increased rates to evaluate KPI correlation models much faster, then the sequencer can ensure absolute ordering and the correct play back speed.

Embodiments of the intelligent sequencer combine both reliability and real-time functionality. That is, the sequencer ensures that EDRs are not only delivered in absolute order, but also that EDRs are delivered with the appropriate timing constraints. For example, in an embodiment, if events are received too late to ensure absolute ordering, the sequencer can flag these events, send these events to the application, and let the application decide what to do with these flagged events. Related events can also be delivered to the application together. For instance, if the sequencer determines that two events are related based on their timestamp, then the sequencer can deliver these related events together to the application.

In one embodiment, batches of events from the same tick are delivered together to the application. A tick is the minimum granularity of time used for absolute ordering of events. The sequencer also has the ability to process groups of events as a unit. The sequencer can also process events or groups of events within the same tick simultaneously.

Figure 12:
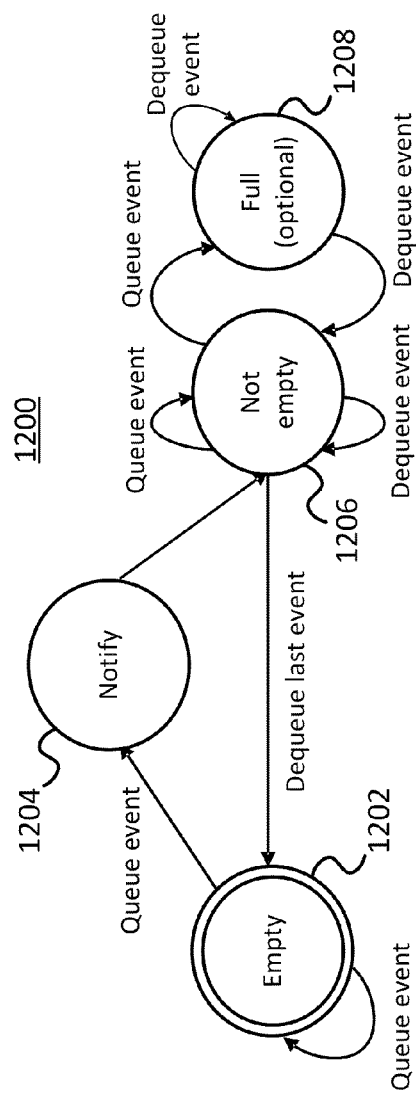
FIG. 12 illustrates a state diagram of an input source in accordance with an embodiment.

FIG. 12 illustrates a state diagram 1200 for an embodiment of an input source. The state diagram provides a description of the behavior of an input source by showing a series of events that can occur in one or more possible states. Each input source gathers data from the network in some way specific to that type of input source and creates events in a standard format that is known to the sequencer. These events are queued in a first-in-first-out (FIFO) queue within each input source. Whenever the input source's FIFO queue is empty and it first becomes non-empty, a notification is sent to the sequencer. This causes the sequencer to start tracking the input source for any changes. When the input source becomes empty, the sequencer stops tracking the input source until it is notified again that the input source is non-empty.

The first state of the state diagram is the Empty state 1202, with the FIFO queue of the input source being empty. In response to a queue event, which may consist of data being inserted into the queue, the state may change from the Empty state to the Notify state 1204, or alternatively stay in the Empty state 1202, as further explained below. When the queue changes from the Empty state to the Not empty state 1206, a notification may be sent to the sequencer, which causes the sequencer to start tracking the input source. In response to additional queue events, the queue may remain in the Not empty state 1206. The queue of the input source can include an optional Full state 1208, where additional events are not added to the queue until additional space is cleared in the queue.

The queue can also be configured such that the queue does not change from the Empty state 1202 to the Not empty state 1206 until at least N events have been added to the queue. For instance, the queue may not change from the Empty state 1202 to the Not empty state 1206, i.e., the queue event loops back to the Empty state 1202 as shown in FIG. 12, until at least two events have been added to the queue. Likewise, the queue may remain in the Full state 1208 even after removing a few events. Notifications may be sent to the sequencer if and when a queue event causes a change from one state to the other. Alternatively, a notification may only be sent to the sequencer when a state change occurs, even though data has been added to or removed from the queue. Likewise, a notification could be sent even when a queue or dequeue event occurs, even though there was not state change. When all the events from the queue have been dequeued, the queue may return to the empty state. When the last event is dequeued the sequencer may be notified and the sequencer may stop tracking the input source. This process may the repeat when an event is added to the queue of the input source and the sequencer begins tracking the input source again.

Figure 15:
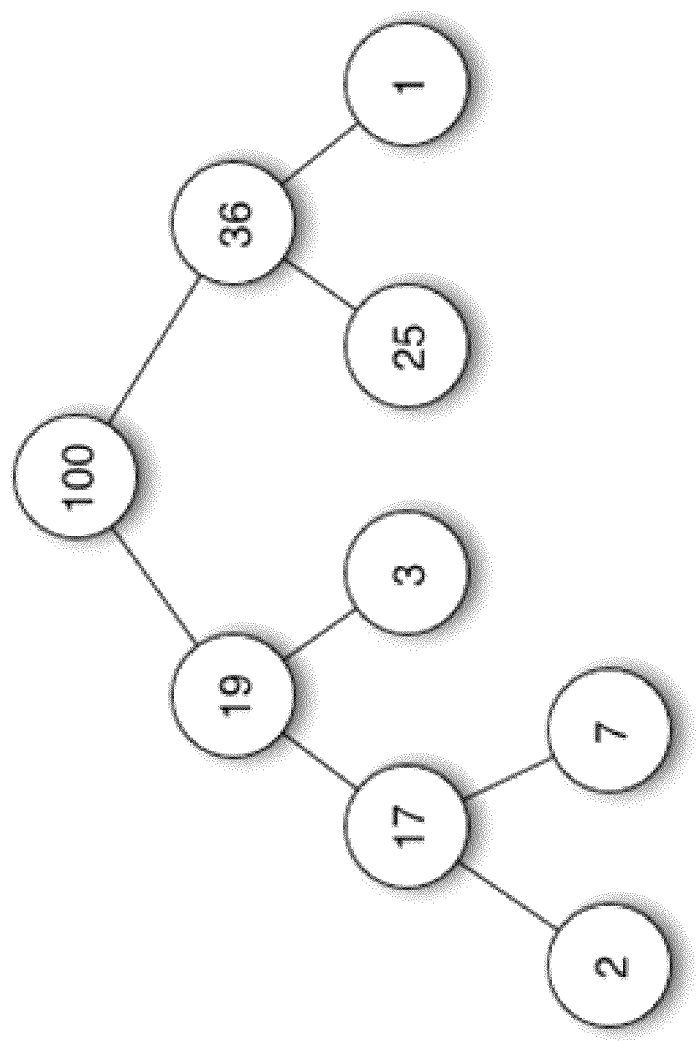
FIG. 15 is an illustration of a binary max-heap in accordance with an embodiment.

The sequencer tracks an input source by adding the input source to a binary heap. A binary heap is a heap data structure comprised of a complete binary tree that meets the heap property. The heap property indicates that each node in the tree is greater than or equal to each of its children (max-heap). Alternatively, the heap property can also indicate that each node in the tree is less than or equal to each of its children (min-heap). An example of a binary max-heap is shown in FIG. 15.

The sort-order for the binary heap is based on the timestamp of the event at the head of the input source's FIFO queue. At any point in time, the oldest available event will be the one at the head of the queue of the input source, which will also be the event at the head of the binary heap.

Embodiments are not limited to using a binary heap for tracking the plurality of input sources. For example, an alternative embodiment can use a data structure that implements a priority queue to track the plurality of input sources. The priority queue can be implemented using linked lists, arrays, heaps, trees, etc. The use of a data structure that implements a priority queue results in the most efficient implementation.

In one embodiment, an input source can control how new events are added to its local FIFO queue. For example, the input source may implement an optional full state, where new events are not added to the FIFO queue if the queue is full. In yet another embodiment, the input source may remain in the empty state until at least N events have been added to the queue. For instance, the input source may continue to indicate to the sequencer that the queue of the input source is empty until at least three events have been added to the queue of the input source.

In one embodiment, the sequencer can be a passive component that does not perform any actions on its own. Instead, the sequencer can be configured to be invoked when the application requests the next available event. In this embodiment, when the application requests an event, the sequencer chooses an event from one of the input sources. If there are no suitable events, the sequencer can return a special value to the application.

Figure 13:
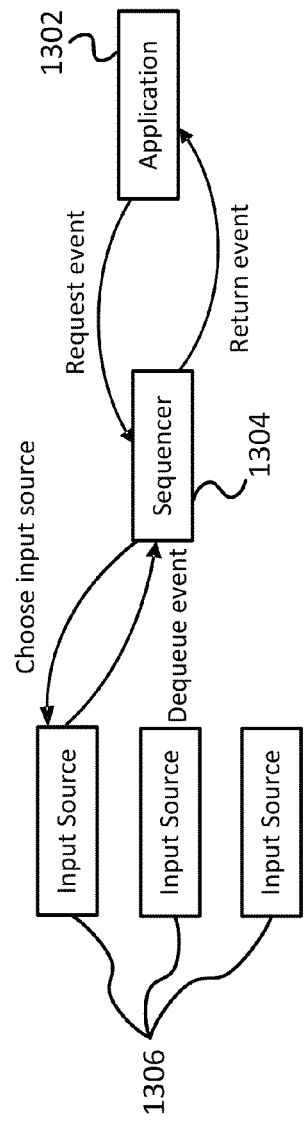
FIG. 13 is a block diagram illustrating details associated with an application requesting an event from a sequencer in accordance with an embodiment.
Figure 14:
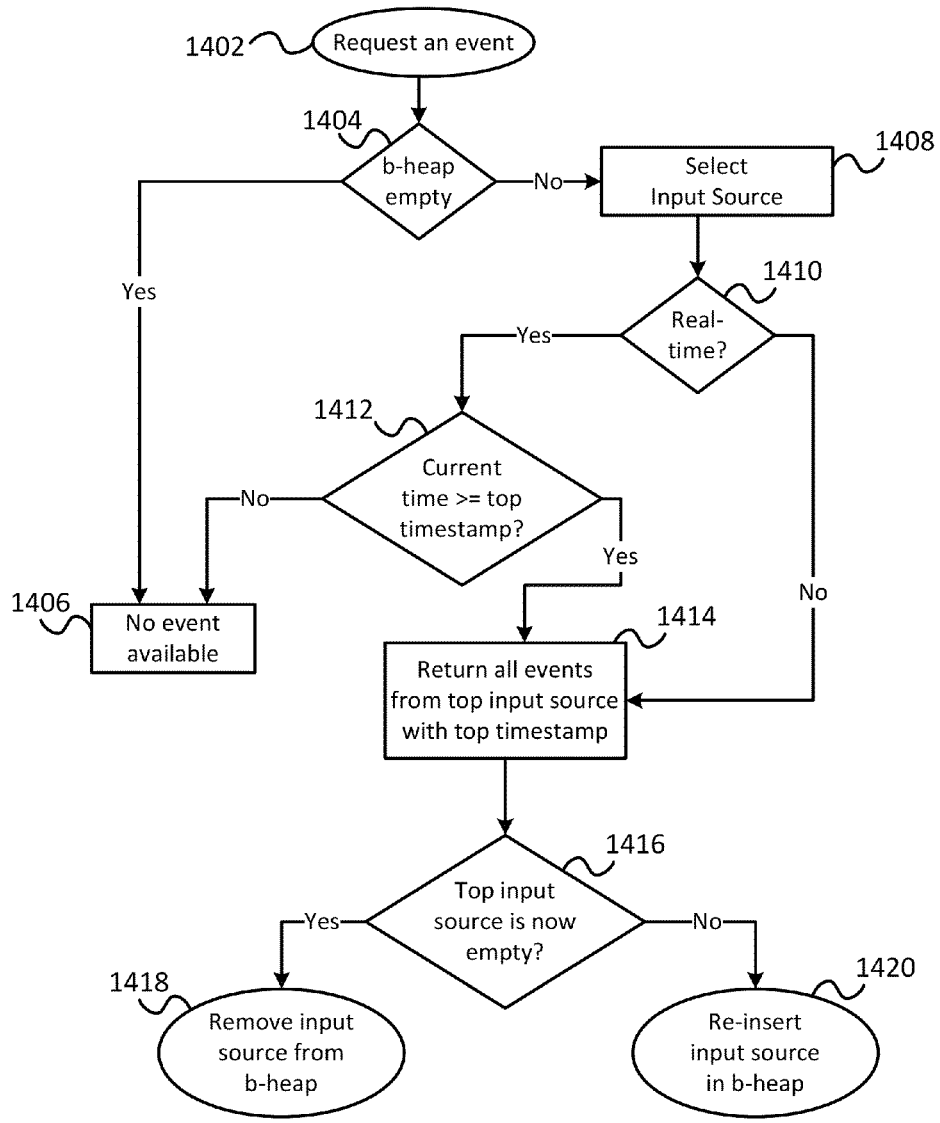
FIG. 14 is a flowchart illustrating details associated with an application requesting an event from a sequencer in accordance with an embodiment.

FIGS. 13 and 14 further illustrate the details associated with the application requesting an event from the sequencer. As shown in FIG. 13, when the application 1302 requests an event from the sequencer 1304, the sequencer 1304 checks the input sources 1306 to see if there are any non-empty input sources available. If all the input sources 1306 are empty, then the application 1302 is notified and no events are returned. As mentioned above, the input source 1306 can be configured such that they become non-empty only after the number of events in the queue of an input source is greater than a threshold. If the sequencer 1304 determines that one or more input sources 1306 are non-empty, then the sequencer 1304 can choose an input source from which to dequeue one or more events to the sequencer, which events are then returned to the application 1302.

The processTimestamp is set equal to the timestamp of the event at the head of the queue from the input source at the head of the binary heap. If the sequencer 1304 is not running in the "as fast as possible" mode, then the sequencer 1304 checks if the current timestamp is greater than or equal to the processTimestamp. If the current timestamp is less than the process timestamp, then no events are returned. Otherwise the sequencer 1304 dequeues events from the current input source until the timestamp of the head event is greater than the sum of the processTimestamp and the tick length, or until the input source is empty.

The flowchart from FIG. 14 begins with the application requesting an event from the sequencer, step 1402. The sequencer first checks to see if the binary heap is empty, step 1404. If the binary heap is empty, then the application is notified that there are no events currently available, step 1406. If the binary heap is not empty, then an input source inserted in the binary heap is selected as the top input source, step 1408. The sequencer then checks to see if the sequencer is running in real-time mode, step 1410. Alternatively, the sequencer may check only once at the beginning of the process to see if it is running in real-time mode, rather than checking every iteration. If the sequencer is running in real-time mode, then the sequencer checks whether the current time is greater than the top timestamp, step 1412. If it is not then, there are no events available, step 1406. Otherwise, all of the events from the input source at the head of the binary heap with a timestamp matching the top timestamp are returned, step 1414. After these events have been removed from the input source at the head of the binary heap, the sequencer checks whether the top input source is now empty, step 1416. If the top input source is now empty, then the top input source is removed from the binary heap and the sequencer stops tracking it, step 1418. If the top input source is not empty (because it has events with newer timestamps), then the top input source is reinserted into the binary heap, step, 1420, which may result in this input source being placed somewhere other than the head of the binary heap.

During normal operation, all input sources should always be in the binary heap since they should never become empty. If an input source becomes empty, but the sequencers knows that the input source will have more data in the future, then the input sequencer will wait a short amount of time for the input source to become available. If the input source becomes available within this time period, the input source is inserted into the heap, otherwise, it is removed from the heap. The heap is managed in this fashion to try to prevent out-of-order events. When the sequencer is not running in the "as fast as possible" mode, the tick length is set to 1 when running at real-time. Setting the value of the tick length to a multiple of real-time causes the sequencer to run at a multiple of real-time. The value of currentTimestamp is incremented in the background such that for every second of real time that passes, tickLength seconds of sequencer time pass.

Yet another embodiment is directed to complex event processing for network testing and network monitoring. The embodiment represents abstract and generic events on a monitored network. For example, VoIP calls, data transfer sessions, and other actions can be represented as events. These events are then processed by tracking the events, correlating one or more events, calculating different types of properties of the events, data enrichment, data normalization, etc. Embodiments further enable a network monitoring infrastructure to be mapped to a set of network events that can be processed and analyzed using complex event processing.

Complex event processing consists of monitoring a set of events, and by analyzing and correlating events from the set of events, determining instances of complex events. Embodiments are directed to the use of complex event processing for real-time monitoring of networks. Network probes gather information about the events happening on said networks. The analysis of the network events can be used to provide data staging—correlation, key performance indicator (KPI) generation, alarm generation, data enrichment, data normalization, etc.

Figure 16:
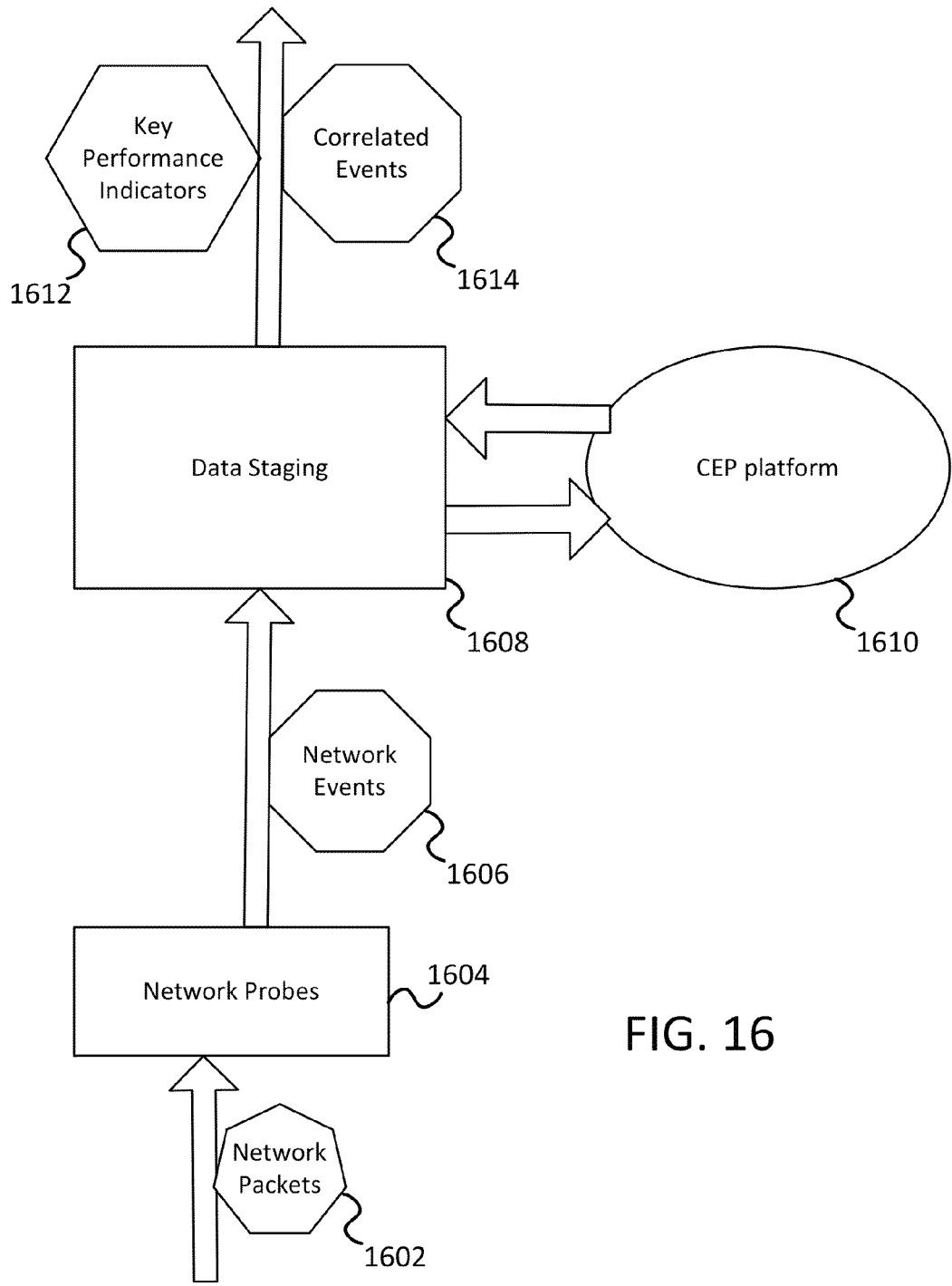
FIG. 16 illustrates the use of a CEP platform to analyze network events in accordance with an embodiment.

FIG. 16 illustrates the use of a CEP platform to analyze network events. Network packets 1602 are detected by network probes 1604. The network probes analyze these packets and form network event records 1606. These records are transposed by the data staging component 1608 so that they can be passed to the CEP platform 1610. The CEP platform 1610 processes the network event records as events and generates the configured output, such as KPIs 1612 and correlated events 1614.

After the CEP processing is complete, a component receives the resulting CEP events back from the CEP platform. These events are transposed so that both standard network events in a format that is required and that is also used for KPI calculation can be completed.

Yet another alternative embodiment uses complex event processing to perform call leg correlation in VoIP networks. In a VoIP network where calls are monitored by a monitoring tool, the same physical phone call may typically be found by multiple network monitoring probes. In order for the monitoring tool to report one physical call leg, each of these independently detected call legs need to be correlated with each other.

An embodiment feeds events describing call legs to a CEP platform, and complex event processing is used to find the correlation between the various call legs, including identifying one or more calls legs as belonging to the same physical call. The complex event processing can be done by writing a set of complex rules or by using an existing CEP platform or tool.

When a call is made on a network, the information that is carried on the network is picked up by network probes. The network probes can decode that information, such as the caller and called phone numbers, the time at which the call was placed, the call duration, possible error codes in each reported call leg, etc. A system that tries to find call legs that belong to the same physical call has to take into account all reported call legs and find relations between them.

In general, call legs can be correlated based on information such as timestamps and shared values across events. When call legs are reported with timestamps that are more than a few seconds apart, however, it is possible that the call legs may not belong to the same call, even if the phone numbers, or corresponding identifiers, match. For instance, if the same probe reports a call leg from A to B and then another one 3 seconds later, it may be that the first one was busy, or not connected, and A simply redialed.

Accordingly, an embodiment analyzes call status and error codes in addition to the timestamp analysis. If a probe reports a call from A to B with success while another one reports a call leg with an error, they may not belong to the same call because a single call either succeeds or fails.

Another embodiment is directed to a generic data mediation platform for use in network monitoring, testing, and analytics. Many network monitoring and testing systems are composed of probes which gather information and dashboards which report that information. Embodiments of the mediation platform described herein integrate with disparate data sources and data consumers, rather than having fixed inputs and fixed outputs. Data from previously independent data sources can be combined and analyzed together, providing additional value to the data consumers. The integrated data can also be output to different types of data consumers, each of which might expect to receive different sets of data in different formats.

In network testing and monitoring, it is common to have a number of tools for network monitoring and testing the network (probes), along with reporting applications (dashboards). These tools may have varying levels of integration with one another, but in general, it can be difficult to combine the data from different types of probes and view it in different types of dashboards.

This problem is accentuated when probes and/or dashboards created by a first party are integrated into a network already using third-party data sources or reporting applications that are desired to continue to be used. Since each installation may contain a different combination of probes and dashboards, from various parties, it can be difficult to integrate this data. In addition, if a particular probe or dashboard is to be integrated into an existing organization, where the particular probe or dashboard is to integrate with a set of third party probes and third party dashboards already in place, it can be difficult to achieve this. Thus, it is desirable to have flexibility as to how data in the network is consumed, augmented, and produced.

Embodiments of the mediation platform can be integrated into the middle of existing products without making significant changes to the probes or dashboards.

An embodiment of the mediation platform accepts data from independent data sources, produces additional metrics, and outputs configurable sets of data to different types of data consumers. The mediation platform can be plugged into the middle of an existing infrastructure where it provides additional value, but does not require significant changes to the other components. In one embodiment, the mediation platform can be configured to compute metrics by using the data enrichment operation described below.

In an embodiment, individual data records from multiple data sources are correlated together based on flexible rules defined by the user. Raw data records from any data source or even the data records produced through correlation may then be used to generate KPIs or to perform additional correlation. The generated data may in turn be fed back through the system, producing additional correlations or more complex data. The correlated data records and KPIs are available to new and existing reporting applications in a configurable format.

Embodiments of the mediation platform can be integrated into the middle of a monitoring or test environment. The mediation platform also can behave as a network probe to interact with existing dashboards and can perform all data transformations in real-time.

Figure 17:
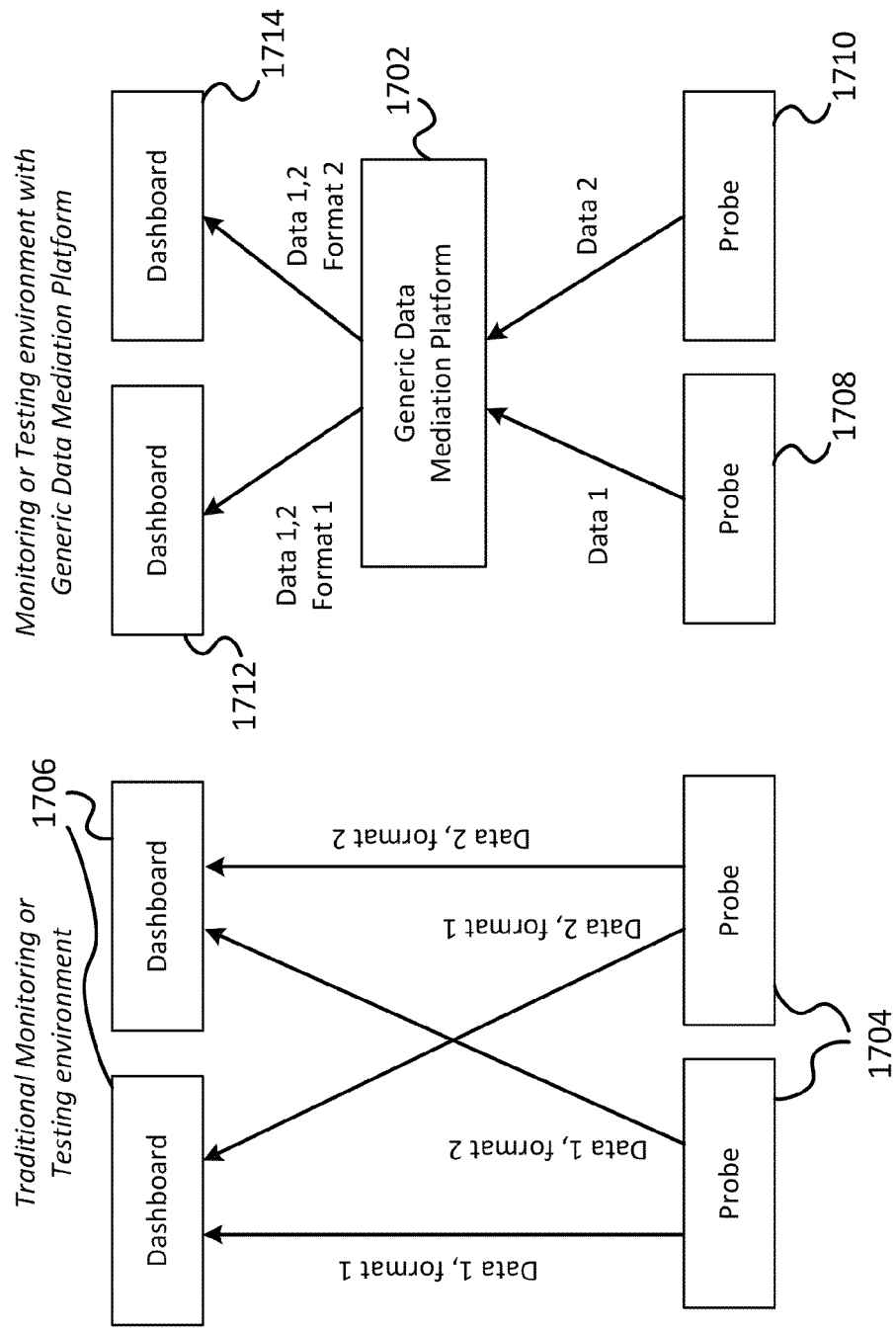
FIG. 17 illustrates how a data mediation platform can be incorporated into an existing network monitoring or testing environment in accordance with an embodiment.

FIG. 17 shows how a generic data mediation platform 1702 can be incorporated into an existing network monitoring or testing environment. The left side of FIG. 17 illustrates a traditional monitoring or testing environment. The example illustrates two probes 1704 in the network generating data that is displayed via two dashboards 1706. The first probe generates data 1 in format 1 for the first dashboard and generates data 1 in format 2 for the second dashboard. Similarly, the second probe generates data 2 in format 1 for the first dashboard and generates data 2 in format 2 for the second dashboard.

The right side of FIG. 17 illustrates an embodiment of the data mediation platform used in a monitoring or testing environment. Rather than data from the probes 1708 and 1710 being directly communicated to the corresponding dashboards 1712 and 1714, the data is sent to the generic data mediation platform 1702. In the embodiment in FIG. 17, the first probe 1708 sends data 1 and the second probe 1710 sends data 2 to the mediation platform 1702. The data mediation platform 1702 converts all data directed to the first dashboard 1712 to format 1, the format associated with the first dashboard. Similarly, the data mediation platform 1702 converts all data directed to the second dashboard 1714 to format 2, the format associated with the second dashboard.

In the simplest case, no changes are made to the data and the platform 1702 simply acts as the central point in the network. In this case, the two dashboard applications would continue to report the exact same information that they would have reported had they been directly connected. This embodiment does not require changes to either the dashboards 1712/1714 or the probes 1708/1710.

In a different embodiment, the platform 1702 may make modifications to the data it receives based on its view of the entire system. In some cases, no changes to the probes or dashboards may be required as the data format may not change.

The generic data mediation platform 1702 performs data correlation in addition to data mediation. The platform correlates information from a plurality of sources (such as a plurality of probes and from third party probes) to provide end-to-end visibility to the user. It also acts as a universal data collector, capable of enriching that data with dimensions and metrics from external sources, such as CRM (customer relationship management) systems, OSS (operations support systems) and order entry solutions.

The platform 1702 performs the following operations on the data: data filtering, data normalization, data enrichment, data correlation, data aggregation and KPIs, and data thresholding and alerts. Most importantly, the platform 1702 allows the user to define the behavior of each of these processing engines using the various configurations described above. That is, an end-user of the platform 1702, as opposed to the programmer of the platform 1702, specifies how to perform data filtering, data normalization, data enrichment, data correlation, data aggregation, KPIs, data thresholding and alerts. As such, the platform 1702 enables an end-user to configure every aspect of the platform 1702.

Data filtering allows a specified subset of incoming data to be processed. Data normalization transforms data from different sources to a standardized format. For example, data from a first probe and data from a second probe can both be converted to a uniform format.

Data enrichment adds additional data to the output data that is derived from the input data, but is not directly contained in the input data. For instance, the CDR for a call may include numeric fields, but the CDR itself would not indicate that a call was originated by a party from Bedford, and the call was received by another party in Reno, and that the call was routed through a particular carrier. Data enrichment could then be used to add meaningful data to the data mediated by the platform. Enrichment is used to enhance input data. Formulas can be used to describe how the enrichment data is used. For example, enrichment data can be used to only generate KPIs for a specific set of customers.

Enrichment enables a user to establish and configure relationships between external information and the data processed by the platform, including data events, KPIs, and other output events. For example for a data event containing IP addresses for networks and networking gear, enrichment could be used to match these IP addresses to a geographic location. The external data could include the location name, type of the address, etc. Using an enrichment scheme like this could monitor the network based off of geographic location.

Data correlation finds related data events from the same or different sources and generates new events based on the combined information from correlated events. For example, if the platform is processing VoIP feeds, each side of a VoIP call results in one call record and many media records. As a result, the corresponding input source produces one call event data record (EDR) and many media EDRs. Using the correlation engine, these call and media EDRs may be associated with one another. If there are multiple probes that detect the same call, then the associated EDRs from each probe may be correlated to produce a single picture of the call.

The correlator correlates or associates events of one or several types, producing new events. For example, a correlator could be defined to associate media events with their call event. Another correlator could be defined to correlate multiple call legs belonging to the same call. The logic for correlation is scriptable. In particular, the correlator performs association and correlation. Association is when multiple events are bound together based on a common attribute, like a call ID. The result of association may be a root data event to which the remaining, unchanged data events are associated. Correlation is when the values of multiple events are combined. For example, two data events showing voice quality for the same call over different call legs might choose to keep the lowest of the voice quality scores. The result of correlation is a single data event that contains values made up from the correlated data events.

The correlator keeps a list of active output events and tries to match input events to active output events. If there is a match, the input event either gets correlated or associated with the output event. Otherwise, a new output event is created based on the input event. An output event is normally output by the correlator after a configured amount of time. The correlator can also be configured to output events as soon as an input event gets correlated or associated with the output event, or when an input event with a certain criteria is received. For example, the correlator can be configured to wait for five seconds for events to be correlated, but to output an event right away if correlation is disabled for that event.

The platform 1702 can process data records from multiple input sources, with each input source independently and asynchronously producing a stream of events in local order (based on event timestamps). In an embodiment, the platform 1702 uses the intelligent sequencer as described above, to order events between all input sources before further processing (i.e. correlation, KPI generation, output, alerts, etc.) is performed on those events. In particular, the sequencer is needed by the data mediation platform 1702 because events are time sensitive and the ordering of events can make a difference when correlating events and generating KPIs from events from multiple sources.

For events to always be ordered between sources, the platform 1702 must process events far enough in the past to allow all of the events with the same timestamp to be retrieved from all of the input sources. As noted above, the sequencer manages this by running with a configured delay, which is also configurable by the user. For example, if the delay is two minutes, this means that events are processed two minutes after they were generated. This delay needs to take into account delays in retrieving data from the input sources. If the input sources produce sixty seconds of data per file, and if the file transfer takes up to thirty seconds, the time delay must be configured to at least ninety seconds since an event could be received by the platform up to ninety seconds after the record was generated by the input source.

In an embodiment, as soon as data is generated by a probe or an application, it is immediately transmitted to the input source. In yet another embodiment, data may be delivered in batches, with the batches determined by a file size, or by a time constraint. For instance, data for a period of time may be saved and transmitted in one transaction to the input source of the platform. For example, if a probe produces sixty seconds of data per file, meaning that all of the data gathered during a sixty second period is written to a file, and after the sixty seconds the file is transmitted to the platform.

If the configured delay is too small, events between sources can be processed out of order. This can happen if by the time an event with timestamp X is retrieved from an input source, events with timestamp X+Y have already been processed from other input sources. When this happens, event correlation can be incorrect, and some events might not take part of KPI calculation if the KPI period for timestamp X was already generated. Events received with a delay longer than the configured delay can be processed as fast as possible by the sequencer as long as they are not too old. The maximum age for processing an event is configurable.

Figure 18:
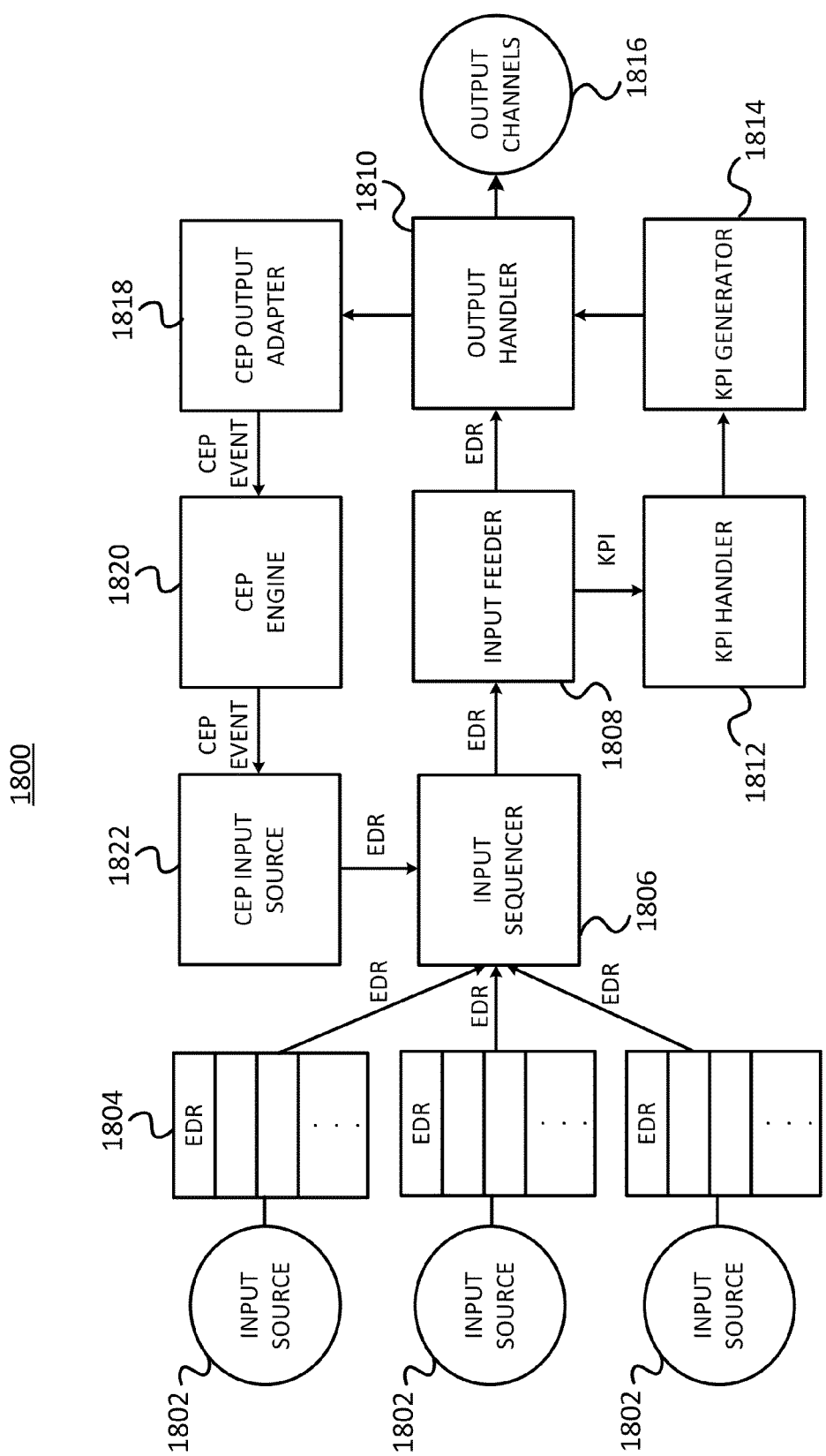
FIG. 18 illustrates a system architecture for a generic data mediation platform in accordance with an embodiment.

FIG. 18 illustrates a system architecture 1800 for the generic data mediation platform 1702 in accordance with an embodiment. The platform 1702 receives input data from the input sources 1802, with each input source independently and asynchronously producing a stream of events in local order. Each input source 1802 tracks events with a queue 1804. The events from the input sources are sequenced in absolute order based on the timestamps of the events by input sequencer 1806. The input feeder 1808 consumes the events from the input sequencer 1806 (after they have been sequenced). The input feeder 1808 receives EDR events with associated KPI data events attached to them from the input sequencer 1806. The input feeder 1808 will then send EDR events to the output handler 1810 and will send the extracted KPI data events to the KPI handler 1812. The KPI handler 1812 sends KPI data events to the correct KPI generator(s) 1814, which produce output events which are sent to the output handler 1810. Once at the output handler 1810, an event may be output by any output channels 1816 which are configured to output that type of event (whether it's an EDR, KPI, or alert). An output channel 1816 uses a specific output plugin based on its configuration. The output plugin outputs the data in some manner, such as to a CSV file.

The output handler 1810 can also output data to an output adapter, which converts the data to a specific format. For instance, if a first dashboard expects data in a particular format, then a first output adapter may output the data in the needed format. An example of an output adapter is CEP output adapter 1818, which converts the data generated by the platform to a format that can be processed by the CEP engine 1820, as discussed above. The output from the CEP engine 1820 can then be processed by a CEP input source 1822, which converts the output from the CEP engine 1820 into a format which can be input into the input sequencer 1806, creating a feedback loop in the platform.

A number of computing systems have been described throughout this disclosure. The descriptions of these systems are not intended to limit the teachings or applicability of this disclosure. Further, the processing of the various components of the illustrated systems may be distributed across multiple machines, networks, and other computing resources. For example, various components may be implemented as separate devices or on separate computing systems, or alternatively as one device or one computing system. In addition, two or more components of a system may be combined into fewer components. Further, various components of the illustrated systems may be implemented in one or more virtual machines, rather than in dedicated computer hardware systems. Likewise, the data repositories shown may represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown may communicate with any other subset of components in various implementations.

Depending on the embodiment, certain acts, events, or functions of any of the algorithms described herein may be performed in a different sequence, may be added, merged, or left out altogether (e.g., not all described acts or events are necessary for the practice of the algorithms). Moreover, in certain embodiments, acts or events may be performed concurrently, e.g., through multi-threaded processing, interrupt processing, or multiple processors or processor cores or on other parallel architectures, rather than sequentially.

Each of the various illustrated systems may be implemented as a computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state. Each service described, such as those shown in FIG. 2, may be implemented by one or more computing devices, such as one or more physical servers programmed with associated server code.

Conditional language used herein, such as, among others, "may," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated may be made without departing from the spirit of the disclosure. As will be recognized, the processes described herein may be embodied within a form that does not provide all of the features and benefits set forth herein, as some features may be used or practiced separately from others. The scope of protection is defined by the appended claims rather than by the foregoing description. All changes which come within the meaning and range of equivalency of the claims are to be embraced within their scope.

What is claimed:

1. A method of correlating one or more call legs of a Voice Over Internet Protocol (VoIP) call, comprising the steps of:
    detecting a first call leg among the one or more call legs with a first network probe from a plurality of network probes, wherein the detecting a first call leg comprises describing the first call leg using a first event that includes a first plurality of fields, wherein the first plurality of fields includes at a least timestamp and an error code;
    detecting a second call leg among the one or more call legs with a second network probe from the plurality of network probes, wherein the detecting a second call leg comprises describing the second call leg using a second event that includes a second plurality of fields, wherein the second plurality of fields includes at least a timestamp and an error code;
    determining one or more relationships between the first call leg and a second call leg based on one or more complex event processing rules configured to parse the first plurality of fields and the second plurality of fields;
    correlating the first call leg and the second leg based on a parsing of the first plurality of fields and the second plurality of fields with the one or more complex event processing rules;
    identifying the first call leg and the second call leg as belonging to a single call based on the one or more relationships and the correlation; and
    reporting the first call leg and the second leg as the single call when the timestamp and the error code in the first plurality of fields match the timestamp and the error code in the second plurality of fields.

2. A method of correlating one or more call legs of a Voice Over Internet Protocol (VoIP) call, comprising the steps of:
    detecting a first call leg among the one or more call legs with a first network probe from a plurality of network probes, wherein the detecting a first call leg comprises describing the first call leg using a first event that includes a first plurality of fields, wherein the first plurality of fields includes at least timestamps, a caller phone number, and a called phone number;
    detecting a second call leg among the one or more call legs with a second network probe from the plurality of network probes, wherein the detecting a second call leg comprises describing the second call leg using a second event that includes a second plurality of fields, wherein the second plurality of fields includes at least timestamps, a caller phone number, and a called phone number;
    determining one or more relationships between the first call leg and a second call leg based on one or more complex event processing rules configured to parse the first plurality of fields and the second plurality of fields;
    correlating the first call leg and the second leg based on a parsing of the first plurality of fields and the second plurality of fields with the one or more complex event processing rules;
    identifying the first call leg and the second call leg as belonging to a single call based on the one or more relationships and the correlation; and
    reporting the first call leg and the second leg as the single call when the timestamps, the caller phone number, and the called phone number in the first plurality of fields match the timestamps, the caller phone number, and the called phone number in the second plurality of fields.

3. The method of claim 2, wherein the first plurality of fields and the second plurality of fields further comprise a call duration.

4. A non-transitory computer readable storage medium storing thereon computer executable instructions for a generic data mediation platform for a monitoring and testing of a network, the instructions comprising:
    receiving a first data from a first network probe from a plurality of network probes, the first network probe generating the first data using a first format;
    receiving a second data from a second network probe from the plurality of network probes, the second network probe generating the second data using a second format different from the first format;
    determining a first data set and a first receiving data format requested by a first dashboard associated with a first party;
    determining a second data set and a second receiving data format requested by a second dashboard associated with a second party, the second receiving data format being different from the first receiving data format, and wherein the first party and the second party are different;

converting the first data to the first receiving data format if the first format is different than the first receiving format and if the first data is included in the first data set;

converting the second data to the second receiving data format if the second format is different than the second receiving format and if the second data is included in the second data set;

converting the first data to the second receiving data format if the first format is different than the second receiving format and if the first data is included in the second data set;

converting the second data to the first receiving data format if the second format is different than the first receiving format and if the second data is included in the first data set;

sending the first data to the first dashboard and the second dashboard; and sending the second data to the first dashboard and the second dashboard.

5. The non-transitory computer readable storage medium of claim 4, wherein the converting the first data to the first receiving data format comprises generating key performance indicators based on the first data using and the first receiving data format.

6. A non-transitory computer readable storage medium storing thereon computer executable instructions for a generic data mediation platform for a monitoring and testing of a network, the instructions comprising:

receiving a first data from a first network probe from a plurality of network probes, the first network probe generating the first data using a first format, wherein the first network probe is associated with a third party;

receiving a second data from a second network probe from the plurality of network probes, the second network probe generating the second data using a second format different from the first format, wherein the second network probe is associated with a fourth party;

determining a first data set and a first receiving data format requested by a first dashboard associated with a first party, and wherein the first party and the third party are different;

determining a second data set and a second receiving data format requested by a second dashboard associated with a second party, the second receiving data format being different from the first receiving data format;

converting the first data to the first receiving data format if the first format is different than the first receiving format and if the first data is included in the first data set;

converting the second data to the second receiving data format if the second format is different than the second receiving format and if the second data is included in the second data set;

converting the first data to the second receiving data format if the first format is different than the second receiving format and if the first data is included in the second data set;

converting the second data to the first receiving data format if the second format is different than the first receiving format and if the second data is included in the first data set;

sending the first data to the first dashboard and the second dashboard; and sending the second data to the first dashboard and the second dashboard.

7. The non-transitory computer readable storage medium of claim 6, wherein the third party and the fourth party are different.

8. A non-transitory computer readable storage medium storing thereon computer executable instructions for a generic data mediation platform for a monitoring and testing of a network, the instructions comprising:

receiving a first data from a first network probe from a plurality of network probes, the first network probe generating the first data using a first format;

receiving a second data from a second network probe from the plurality of network probes, the second network probe generating the second data using a second format different from the first format;

determining a first data set and a first receiving data format requested by a first dashboard;

determining a second data set and a second receiving data format requested by a second dashboard, the second receiving data format being different from the first receiving data format;

converting the first data to the first receiving data format if the first format is different than the first receiving format and if the first data is included in the first data set;

converting the second data to the second receiving data format if the second format is different than the second receiving format and if the second data is included in the second data set;

converting the first data to the second receiving data format if the first format is different than the second receiving format and if the first data is included in the second data set;

converting the second data to the first receiving data format if the second format is different than the first receiving format and if the second data is included in the first data set;

sending the first data to the first dashboard and the second dashboard;

sending the second data to the first dashboard and the second dashboard;

generating a third data by correlating the first data and the second data; and converting the third data to the first receiving data format or the second receiving data format.

9. The non-transitory computer readable storage medium of claim 8, wherein the platform is further configured to add data from an external source to the third data.

10. The non-transitory computer readable storage medium of claim 8, wherein the platform is further configured to allow an end-user to define one or more operations to which the first data and the second data are applied.

11. The non-transitory computer readable storage medium of claim 10, wherein the one or more operations comprise any of data filtering, data normalization, data enrichment, data correlation, data aggregation, generation of key performance indicators, data thresholdings, and alerting.

12. The non-transitory computer readable storage medium of claim 10, wherein the first network probe generates the first data asynchronously from the second network probe generating the second data.

* * * * *